(12) United States Patent
Ozturk et al.

(10) Patent No.: US 12,256,275 B2
(45) Date of Patent: Mar. 18, 2025

(54) TECHNIQUES FOR CONFIGURING MULTIPLE SECONDARY CELL GROUPS

(71) Applicant: QUALCOMM Incorporated, San Diego, CA (US)

(72) Inventors: Ozcan Ozturk, San Diego, CA (US); Punyaslok Purkayastha, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/674,372

(22) Filed: Feb. 17, 2022

(65) Prior Publication Data

US 2023/0262541 A1     Aug. 17, 2023

(51) Int. Cl.
    *H04W 36/00*     (2009.01)
(52) U.S. Cl.
    CPC ... *H04W 36/0069* (2018.08); *H04W 36/0058* (2018.08); *H04W 36/00837* (2018.08)
(58) Field of Classification Search
    CPC ......... H04W 36/0069; H04W 36/0058; H04W 36/00837
    See application file for complete search history.

(56) References Cited

U.S. PATENT DOCUMENTS

| 2022/0408323 | A1* | 12/2022 | Ishii | H04W 36/362 |
| 2023/0292192 | A1* | 9/2023 | Eklöf et al. | H04W 36/00698 |
| 2023/0403613 | A1* | 12/2023 | Kordybach | H04W 76/15 |
| 2023/0413153 | A1* | 12/2023 | Zhang | H04W 76/20 |

FOREIGN PATENT DOCUMENTS

WO     WO-2021090626 A1     5/2021

OTHER PUBLICATIONS

Qualcomm et al. (Signaling related to Conditional PSCell addition/change configuration, R3-206178, Nov. 2020).*
International Search Report and Written Opinion—PCT/US2023/010949—ISA/EPO—Apr. 20, 2023.
(Continued)

*Primary Examiner* — Lakeram Jangbahadur
(74) *Attorney, Agent, or Firm* — QUALCOMM Incorporated

(57) ABSTRACT

The described techniques relate to improved methods, systems, devices, and apparatuses that support multi-secondary cell group configurations. Generally, the described techniques provide for a configuration that enables a user equipment (UE) to perform multiple conditional primary and secondary cell (PSCell) addition or change procedures. For instance, the UE may perform a series of conditional PSCell changes and/or conditional PSCell additions based on a single configuration provided by a network entity. In such cases, the single configuration may be based on a subset of secondary nodes (secondary nodes) that are identified by one or more target secondary nodes. In some aspects, the single configuration may include an indication that the configuration may be used for multiple PSCell changes or additions, and the UE may store the configuration based on the indication.

27 Claims, 21 Drawing Sheets

(56) References Cited

OTHER PUBLICATIONS

Nokia., et al., "Enhancements Related to the Conditional PSCell Change", 3GPP TSG-RAN WG3 Meeting #110-e, R3-205947, 3rd Generation Partnership Project, Mobile Competence Centre, 650, Route Des Lucioles, F-06921 Sophia-Antipolis Cedex, France, vol. RAN WG3, No. E-meeting, Nov. 2, 2020-Nov. 12, 2020, 2 Pages, Oct. 22, 2020, XP051941604.
Qualcomm Incorporated: "Signaling Related to Conditional PSCell Addition/Change Configuration", 3GPP TSG-RAN WG3 Meeting #110-e, R3-206178, 3rd Generation Partnership Project (3GPP), Mobile Competence Centre, 650, Route Des Lucioles, F-06921 Sophia-Antipolis Cedex, France, vol. RAN WG3, No. E-meeting, Nov. 2, 2020-Nov. 12, 2020, Oct. 23, 2020, 7 Pages, XP051945751, p. 1-p. 7.
Qualcomm Incorporated: "SN Initiated Inter-SN CPC Procedure: Preparation, Execution, and Data Forwarding", 3GPP TSG-RAN WG3 Meeting #111-e, R3-210354, 3rd Generation Partnership Project (3GPP), Mobile Competence Centre, 650, Route Des Lucioles, F-06921 Sophia-Antipolis Cedex, France, vol. RAN WG3, No. E-Meeting, Jan. 25, 2021-Feb. 5, 2021, Jan. 15, 2021, 7 Pages, XP051975064, p. 1-p. 7.

\* cited by examiner

TECHNIQUES FOR CONFIGURING MULTIPLE SECONDARY CELL GROUPS

FIELD OF TECHNOLOGY

The following relates to wireless communications, including multi-secondary cell group configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multi-secondary cell group configurations. Generally, the described techniques provide for a configuration that enables a user equipment (UE) to perform multiple primary secondary cell (PSCell) addition or change procedures. For instance, the UE may perform a series of conditional PSCell changes and/or conditional PSCell additions based on a single configuration provided by a network entity. In such cases, the single configuration may be based on a subset of secondary nodes that are identified by one or more target secondary nodes. As an example, a master node may transmit a message to each secondary node of a set of target secondary nodes, where the message may include respective target secondary node identifiers for the set of target secondary nodes. In response, each target secondary node may transmit a message to the master node that indicates a subset of secondary nodes (e.g., one or more preferred secondary nodes) based on the target secondary node identifiers indicated by the master node.

The master node may transmit a control message (e.g., an RRC reconfiguration message) to the UE indicating a configuration that includes a set of execution conditions for the multiple PSCell change or addition procedures, where the execution conditions may be based on the subset of (preferred) secondary nodes indicated by each target secondary node. The UE may store the configuration, which may include the set of execution conditions, secondary cell group (SCG) configurations associated with prepared PSCells, master cell group (MCG) configurations, or any combination thereof, for use in the series of conditional PSCell changes or additions. In some aspects, the configuration received by the UE includes an indication that the configuration may be used for multiple PSCell changes or additions, and the UE may store the configuration based on the indication. In any case, the use of a single configuration stored at the UE for multiple conditional PSCell changes or additions may minimize signaling overhead by avoiding the signaling of configurations each time the UE changes or adds a PSCell.

A method for wireless communications at a user equipment (UE) is described. The method may include receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures, establishing a first connection with a first target PSCell of the two or more PSCells based on the configuration and a first set of execution conditions being satisfied, where the first target PSCell is associated with a first secondary node, and establishing a second connection with a second target PSCell of the two or more PSCells based on the configuration and a second set of execution conditions being satisfied, where the second target PSCell is associated with the first secondary node or a second secondary node.

An apparatus for wireless communications at a UE is described. The apparatus may include a processor, memory coupled with the processor, and instructions stored in the memory. The instructions may be executable by the processor to cause the apparatus to receive, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures, establish a first connection with a first target PSCell of the two or more PSCells based on the configuration and a first set of execution conditions being satisfied, where the first target PSCell is associated with a first secondary node, and establish a second connection with a second target PSCell of the two or more PSCells based on the configuration and a second set of execution conditions being satisfied, where the second target PSCell is associated with the first secondary node or a second secondary node.

Another apparatus for wireless communications at a UE is described. The apparatus may include means for receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures, means for establishing a first connection with a first target PSCell of the two or more PSCells based on the configuration and a first set of execution conditions being satisfied, where the first target PSCell is associated with a first secondary node, and means for establishing a second connection with a second target PSCell of the two or more PSCells based on the configuration and a second set of execution conditions being satisfied, where the second target PSCell is associated with the first secondary node or a second secondary node.

A non-transitory computer-readable medium storing code for wireless communications at a UE is described. The code may include instructions executable by a processor to receive, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures, establish a first connection with a first target PSCell of the two or more PSCells based on the configuration and a first set of execution conditions being satisfied, where the first target PSCell is associated with a first secondary node, and establish a second connection with a second target PSCell of the two or more PSCells based on the configuration and a second set of execution conditions being satisfied, where the second target PSCell is associated with the first secondary node or a second secondary node.

Some examples of the method, apparatuses, and non-transitory computer-readable medium described herein may further include operations, features, means, or instructions for receiving, from the master node, a second control message indicating the second set of execution conditions for the second target PSCell, where the second control message may be received after the first control message.

In some examples of the method, apparatuses, and non-transitory computer-readable medium described herein, the second control message indicates a first measurement configuration for the first target PSCell that may be modified with respect to a previous measurement configuration for the first target PSCell and the method, apparatuses, and non-transitory computer-readable medium may include further operations, features, means, or instructions for performing one or more measurements based on the first measurement configuration for the first target PSCell.

In some examples of the method, apparatuses, and non-transitory computer-readable medium described herein, the configuration includes an indication of the set of multiple target secondary nodes, one or more target PSCells of each secondary node of the set of multiple target secondary nodes, a set of execution conditions for an addition of or change to the one or more target PSCells, respective secondary cell group configurations associated with each PSCell of the one or more target PSCells, one or more master cell group configurations, or any combination thereof.

Some examples of the method, apparatuses, and non-transitory computer-readable medium described herein may further include operations, features, means, or instructions for storing the set of execution conditions, the respective secondary cell group configurations associated with each PSCell of the one or more target PSCells, the one or more master cell group configurations, or any combination thereof, based on the indication that the configuration may be applicable to the series of conditional procedures, where the series of conditional procedures may be based on storing the set of execution conditions, the respective secondary cell group configurations associated with each PSCell of the one or more target PSCells, the one or more master cell group configurations, or any combination thereof.

In some examples of the method, apparatuses, and non-transitory computer-readable medium described herein, the UE stores the set of execution conditions, the respective secondary cell group configurations associated with each PSCell of the one or more target PSCells, the one or more master cell group configurations, or any combination thereof, after performing an addition of a target PSCell, a change of a target PSCell, or both, based on the indication.

In some examples of the method, apparatuses, and non-transitory computer-readable medium described herein, the configuration includes respective PSCell configurations of a set of multiple prepared PSCells, each PSCell configuration of the respective PSCell configurations being relative to another PSCell configuration of the respective PSCell configurations, or relative to a source PSCell configuration, or any combination thereof.

A method for wireless communications at a secondary node is described. The method may include receiving, from a master node associated with a primary cell, a first message indicating respective identifiers for a set of multiple target secondary nodes including the secondary node, a set of measurement results for the secondary node, and one or more candidate PSCells associated with the secondary node and transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

An apparatus for wireless communications at a secondary node is described. The apparatus may include a processor, memory coupled with the processor, and instructions stored in the memory. The instructions may be executable by the processor to cause the apparatus to receive, from a master node associated with a primary cell, a first message indicating respective identifiers for a set of multiple target secondary nodes including the secondary node, a set of measurement results for the secondary node, and one or more candidate PSCells associated with the secondary node and transmit, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

Another apparatus for wireless communications at a secondary node is described. The apparatus may include means for receiving, from a master node associated with a primary cell, a first message indicating respective identifiers for a set of multiple target secondary nodes including the secondary node, a set of measurement results for the secondary node, and one or more candidate PSCells associated with the secondary node and means for transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

A non-transitory computer-readable medium storing code for wireless communications at a secondary node is described. The code may include instructions executable by a processor to receive, from a master node associated with a primary cell, a first message indicating respective identifiers for a set of multiple target secondary nodes including the secondary node, a set of measurement results for the secondary node, and one or more candidate PSCells associated with the secondary node and transmit, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

Some examples of the method, apparatuses, and non-transitory computer-readable medium described herein may further include operations, features, means, or instructions for transmitting, within the second message, an indication of one or more prepared PSCells associated with the secondary node and a respective secondary cell group configuration for each prepared PSCell of the one or more prepared PSCells and receiving, from the master node, a third message indicating a set of prepared target PSCells associated with the subset of secondary nodes, the set of prepared target PSCells including the one or more prepared PSCells associated with one of the subset of secondary nodes, where the series of conditional procedures may be based on the set of prepared target PSCells.

Some examples of the method, apparatuses, and non-transitory computer-readable medium described herein may further include operations, features, means, or instructions for transmitting, to the master node, a fourth message indicating respective measurement configurations for the one or more prepared PSCells associated with the secondary node in response to the third message, where the respective measurement configurations may be based on the set of prepared target PSCells associated with one of the subset of the secondary node.

Some examples of the method, apparatuses, and non-transitory computer-readable medium described herein may further include operations, features, means, or instructions for determining a set of execution conditions associated with each PSCell of the set of prepared target PSCells associated with the subset of secondary nodes and transmitting, within the fourth message, an indication of the set of execution conditions, where the series of conditional procedures may be based on the set of execution conditions.

In some examples of the method, apparatuses, and non-transitory computer-readable medium described herein, the third message includes one or more measurement results associated with the set of prepared target PSCells and the set of execution conditions may be based on the one or more measurement results.

Some examples of the method, apparatuses, and non-transitory computer-readable medium described herein may further include operations, features, means, or instructions for receiving, within the third message, an indication of respective PSCell configurations associated with one or more target PSCells of the set of prepared target PSCells, where the respective PSCell configurations may be indicated as source PSCell configurations and transmitting, to the master node, a fourth message indicating a secondary cell group configuration for a first target PSCell associated with the secondary node and an indication of whether the secondary cell group configuration may be dependent on a source PSCell configuration.

Some examples of the method, apparatuses, and non-transitory computer-readable medium described herein may further include operations, features, means, or instructions for establishing, during a first conditional procedure of the series of conditional procedures, a connection between the UE and a first PSCell associated with the secondary node based on a first set of execution conditions being satisfied, determining a set of execution conditions associated with each PSCell of the set of prepared target PSCells for subsequent conditional procedures of the series of conditional procedures, and transmitting, to the master node, a fifth message indicating the set of execution conditions and a modified measurement configuration for the first PSCell.

Some examples of the method, apparatuses, and non-transitory computer-readable medium described herein may further include operations, features, means, or instructions for receiving, from the UE, a measurement report including measurement results, where the set of execution conditions may be based on the measurement results.

A method for wireless communications at a master node is described. The method may include transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes and receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

An apparatus for wireless communications at a master node is described. The apparatus may include a processor, memory coupled with the processor, and instructions stored in the memory. The instructions may be executable by the processor to cause the apparatus to transmit, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes and receive, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

Another apparatus for wireless communications at a master node is described. The apparatus may include means for transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes and means for receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

A non-transitory computer-readable medium storing code for wireless communications at a master node is described. The code may include instructions executable by a processor to transmit, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes and receive, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

Some examples of the method, apparatuses, and non-transitory computer-readable medium described herein may further include operations, features, means, or instructions for receiving, within the respective second messages from the two or more secondary nodes, an indication of one or more prepared PSCells associated with each secondary node and a respective secondary cell group configuration for each prepared PSCell of the one or more prepared PSCells and transmitting, to each secondary node of the two or more secondary nodes or to each secondary node of the subset of secondary nodes, respective third messages each indicating a set of prepared target PSCells associated with the subset of secondary nodes, where the series of conditional procedures may be based on the set of prepared target PSCells.

Some examples of the method, apparatuses, and non-transitory computer-readable medium described herein may further include operations, features, means, or instructions for receiving, from each secondary node of the two or more secondary nodes, respective fourth messages each indicating measurement configurations for one or more PSCells associated with each secondary node in response to a third message of the respective third messages, where the measurement configurations may be based on the set of prepared target PSCells.

Some examples of the method, apparatuses, and non-transitory computer-readable medium described herein may further include operations, features, means, or instructions for receiving, within the respective fourth messages, an indication of a set of execution conditions, where the series of conditional procedures may be based on the set of execution conditions.

In some examples of the method, apparatuses, and non-transitory computer-readable medium described herein, the respective third messages each include one or more measurement results associated with the set of prepared target PSCells and the set of execution conditions may be based on the one or more measurement results.

Some examples of the method, apparatuses, and non-transitory computer-readable medium described herein may further include operations, features, means, or instructions for transmitting, within the respective third messages, an indication of respective PSCell configurations associated with one or more target PSCells of the set of prepared target PSCells, where the respective PSCell configurations may be indicated as source PSCell configurations and receiving, from a first secondary node of the subset of secondary nodes, a fourth message indicating a secondary cell group configuration for a first target PSCell associated with the first secondary node and an indication of whether the secondary cell group configuration may be dependent on a source PSCell configuration.

Some examples of the method, apparatuses, and non-transitory computer-readable medium described herein may further include operations, features, means, or instructions for transmitting a first control message indicating a configuration for the series of conditional procedures for establishing respective connections with PSCells associated with the set of multiple target secondary nodes and a second indication that the configuration may be applicable to the series of conditional procedures.

In some examples of the method, apparatuses, and non-transitory computer-readable medium described herein, the configuration includes an indication of the subset of secondary nodes, one or more target PSCells of each secondary node of the subset of secondary nodes, a set of execution conditions for an addition of or change to the one or more target PSCells, respective secondary cell group configurations associated with each PSCell of the one or more target PSCells, one or more master cell group configurations, or any combination thereof.

Some examples of the method, apparatuses, and non-transitory computer-readable medium described herein may further include operations, features, means, or instructions for receiving, from at least a first secondary node of the two or more secondary nodes, a fifth message indicating the set of execution conditions and modified measurement configurations for one or more PSCells associated with the first secondary node.

Some examples of the method, apparatuses, and non-transitory computer-readable medium described herein may further include operations, features, means, or instructions for determining the set of execution conditions based on the subset of secondary nodes.

In some examples of the method, apparatuses, and non-transitory computer-readable medium described herein, the configuration includes respective PSCell configurations of a set of multiple prepared PSCells, each PSCell configuration of the respective PSCell configurations being relative to another PSCell configuration of the respective PSCell configurations, or relative to a source PSCell configuration, or any combination thereof.

Some examples of the method, apparatuses, and non-transitory computer-readable medium described herein may further include operations, features, means, or instructions for transmitting, to the UE, a second control message indicating additional execution conditions for a conditional procedure of the series of conditional procedures, the conditional procedure being subsequent to an initial conditional procedure of the series of conditional procedures, where the additional execution conditions may be based on a measurement report from the UE.

Some examples of the method, apparatuses, and non-transitory computer-readable medium described herein may further include operations, features, means, or instructions for receiving a measurement report from the UE and determining to initiate a procedure for changes or additions of PSCells at a secondary node of the UE based on the measurement report, where the first message may be transmitted based on modifying the secondary node of the UE.

A method for wireless communications at a first secondary node is described. The method may include receiving a measurement report from a UE, determining to initiate a procedure for changes or additions to PSCells at a secondary node of the UE based on the measurement report, and transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

An apparatus for wireless communications at a first secondary node is described. The apparatus may include a processor, memory coupled with the processor, and instructions stored in the memory. The instructions may be executable by the processor to cause the apparatus to receive a measurement report from a UE, determine to initiate a procedure for changes or additions to PSCells at a secondary node of the UE based on the measurement report, and transmit, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

Another apparatus for wireless communications at a first secondary node is described. The apparatus may include means for receiving a measurement report from a UE, means for determining to initiate a procedure for changes or additions to PSCells at a secondary node of the UE based on the measurement report, and means for transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

A non-transitory computer-readable medium storing code for wireless communications at a first secondary node is described. The code may include instructions executable by a processor to receive a measurement report from a UE, determine to initiate a procedure for changes or additions to PSCells at a secondary node of the UE based on the measurement report, and transmit, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

Some examples of the method, apparatuses, and non-transitory computer-readable medium described herein may further include operations, features, means, or instructions for receiving, from the master node, a second message indicating one or more prepared PSCells associated a subset of secondary nodes selected from the set of multiple target secondary nodes, determining a modified measurement configuration associated with the first secondary node, and transmitting, to the master node, a third message indicating the modified measurement configuration.

DETAILED DESCRIPTION

Figure 1:
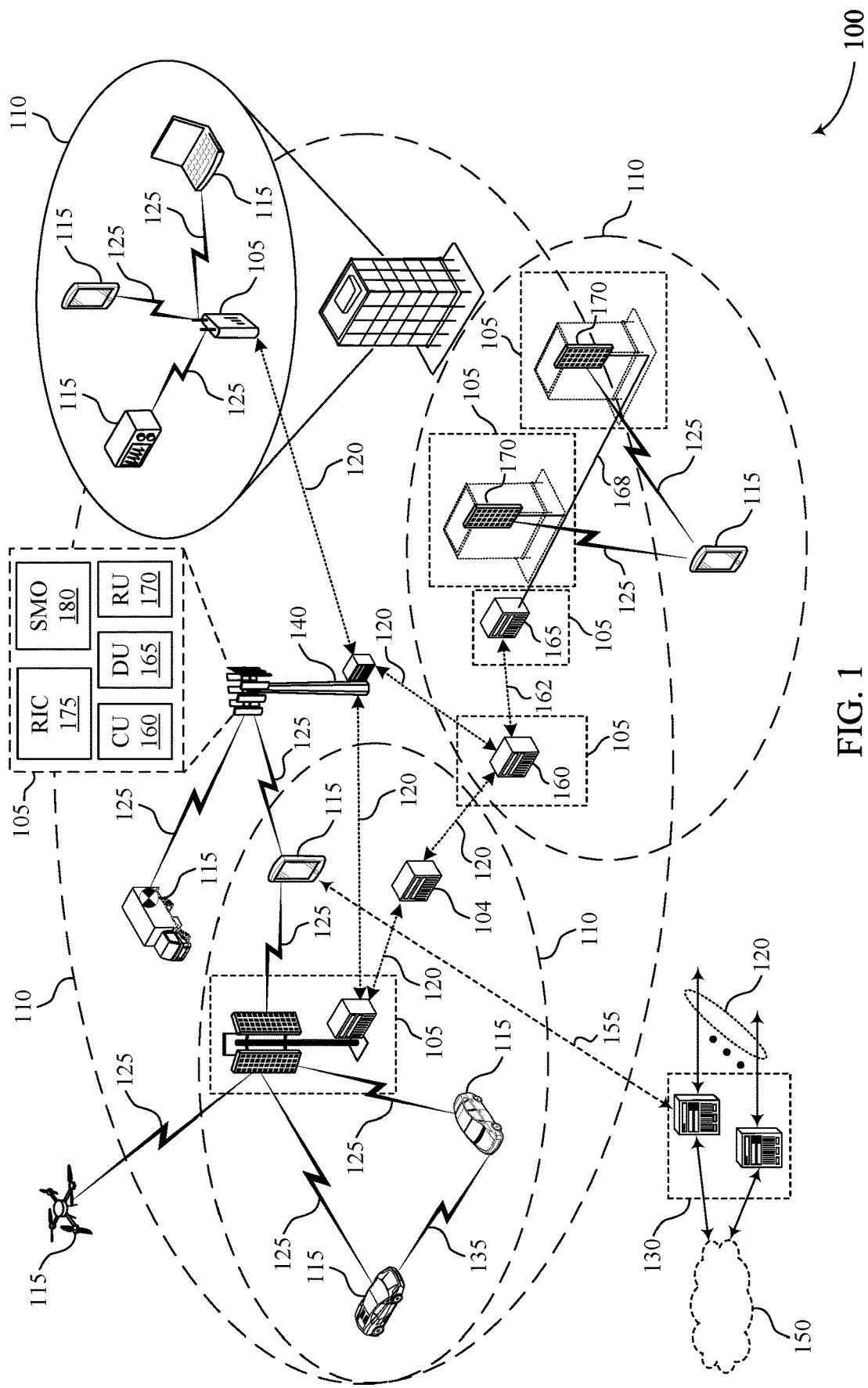
FIG. 1 illustrates an example of a wireless communications system that supports techniques for configuring multiple secondary cell groups (SCGs) in accordance with aspects of the present disclosure.

Some user equipment (UE) may support dual connectivity in which the UE has concurrent connections with multiple nodes in a wireless communications system. For example, the UE may have a connection with a master node via one or more serving cells and may simultaneously have a connection with a secondary node via one or more serving cells. The master node may be associated with one or more serving cells that make up a master cell group (MCG). For example, the master node may be associated with a primary cell (PCell), which may be used for initial access and other types of procedures, and optionally, one or more secondary cells (SCells). The secondary node may also be associated with one or more serving cells that make up a secondary SCG. For example, the secondary node may be associated with a primary secondary cell (PSCell), which may be used for initial access and other types of procedure, and optionally one or more SCells. In some examples, the master node may provide a control plane connection to a core network and the secondary node may provide additional resources to the UE.

In some wireless communications systems, the UE may add or change a serving cell, such as the PSCell. For example, a UE may use a conditional PSCell procedure to add a PSCell or to change a PSCell (e.g., a conditional PSCell addition (CPA) procedure, a conditional PSCell change (CPC) procedure). For example, CPC and CPA procedures may be used to provide SCG configurations (and associated MCG configurations), including resource configurations, and execution conditions for multiple target PSCells. The UE may be configured with the conditional PSCell procedure and may perform (or attempt to perform) the conditional PSCell procedure when a set of triggering conditions (e.g., a set of execution conditions) for the conditional PSCell procedure is satisfied. In some cases, however, the mobility of the UE or a quality of a wireless channel with a current serving cell, or both, may result in many conditional PSCell procedures, and therefore multiple configurations for subsequent conditional PSCell procedures may occur. Frequent configurations may result in excess power consumed at the UE, high signaling overhead, and signaling delay. Additionally, frequent configurations may impact the overall performance of a wireless communications system (e.g., in frequency range 2 (FR2) deployments), where frequent SCG changes may occur.

As described herein, a single configuration may be used for performing multiple conditional PSCell addition or change procedures. For instance, a UE may perform a series of conditional PSCell changes and/or conditional PSCell additions based on a single configuration provided by a network entity. The single configuration may be based on a subset of secondary nodes that are identified by one or more target secondary nodes. As an example, a master node may transmit a message (e.g., an secondary node addition request message) to each secondary node of a set of one or more target secondary nodes, where the message may include respective target secondary node identifiers for the set of one or more target secondary nodes, among other information (e.g., a list of candidate PSCells, measurements received from the UE). In response, each target secondary node may transmit a message (e.g., a secondary node addition request acknowledgment) to the master node that indicates a subset of secondary nodes (e.g., one or more preferred secondary nodes) based on the target secondary node identifiers indicated by the master node. The subset of secondary nodes may be selected or identified, for example, based on a proximity to the target secondary node, or based on one or more additional or other parameters. In some cases, the master node may provide an indication (e.g., via a secondary node modification request message) of the respective target PSCells of the subset of secondary nodes (e.g., the PSCells of the preferred secondary nodes) to each secondary node of the subset of secondary nodes. Each secondary node may respond to the master node with an indication (e.g., via a secondary node modification request acknowledgment message) of an updated measurement configuration for the target PSCells.

Based on the information received related to the subset of target secondary nodes, the master node may transmit a control message (e.g., a radio resource control (RRC) reconfiguration message) to the UE indicating a configuration for the CPA and/or CPC. The configuration may include a set of execution conditions for the multiple conditional PSCell change or addition procedures, where the execution conditions may be based on the subset of secondary nodes indicated by each target secondary node. The UE may store the configuration received from the master node, which may include the set of execution conditions, SCG configurations associated with prepared PSCells, MCG configurations, or any combination thereof, for use in the series of conditional PSCell changes or additions. For example, the UE may retain the configuration after each PSCell change or addition. In some aspects, the configuration may include an indication that the configuration may be used for multiple PSCell changes or additions, and the UE may store the configuration based on the indication. The use of the single configuration stored at the UE for multiple conditional PSCell changes or additions may minimize signaling overhead by avoiding signaling configurations each time the UE adds or changes a PSCell.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to multi-SCG configurations.

FIG. 1 illustrates an example of a wireless communications system 100 that supports techniques for configuring multiple secondary cell groups in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (MC) 175 (e.g., a Near-Real Time MC (Near-RT MC), a Non-Real Time MC (Non-RT MC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 175 is flexible and may support different functionalities depending upon which functions (e.g., network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for configuring multiple secondary cell groups as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some examples, a UE 115 may perform a CPC, CPA, conditional handover, or the like, based on one or more configurations provided by one or more network entities. For example, a master node may provide SCG configurations (e.g., and MCG configurations, in some cases) to the UE 115 for a CPC procedure to establish a connection with one or more target PSCells. Such configurations may include resource block (RB) configurations, execution conditions for multiple target PSCells, and the like.

Wireless communications system 100 may support a single configuration that enables a UE 115 to perform multiple conditional PSCell addition or change procedures.

For instance, the UE 115 may perform a series of conditional PSCell changes and/or conditional PSCell additions based on a single configuration provided by a network entity. In such cases, the single configuration may be based on a subset of secondary nodes that are identified by one or more target secondary nodes. As an example, a master node may transmit a message to each secondary node of a set of target secondary nodes, where the message may include respective target secondary node identifiers for the set of target secondary nodes. In response, each target secondary node may transmit a message to the master node that indicates a subset of secondary nodes (e.g., one or more preferred secondary nodes) based on the target secondary node identifiers indicated by the master node. The master node may transmit a control message (e.g., an RRC reconfiguration message) to the UE 115 indicating a configuration that includes a set of execution conditions for the multiple conditional PSCell change or addition procedures, where the execution conditions may be based on the subset of secondary nodes indicated by each target secondary node. The UE 115 may store the configuration received from the master node, which may include the set of execution conditions, SCG configurations associated with prepared PSCells, MCG configurations, or any combination thereof, for use in the series of conditional PSCell changes or additions. As such, the UE 115 may retain the configuration after each conditional PSCell change or addition (e.g., for use with subsequent PSCell changes and/or additions). In some aspects, the configuration may include an indication that the configuration may be used for multiple PSCell changes or additions, and the UE 115 may store the configuration based on the indication. The use of the single configuration stored at the UE 115 for multiple conditional PSCell changes or additions may minimize signaling overhead by avoiding signaling configurations each time the UE 115 adds or changes a PSCell.

Figure 2:
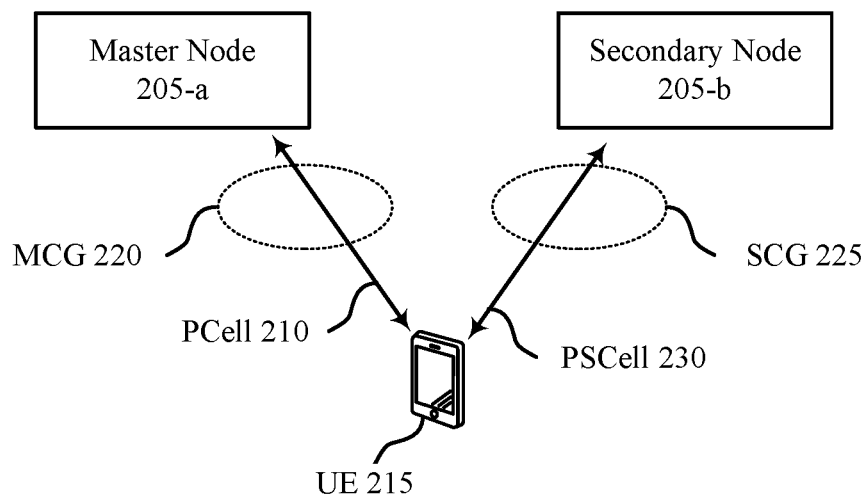
FIG. 2 illustrates an example of a wireless communications system that supports techniques for configuring multiple SCGs in accordance with aspects of the present disclosure.

FIG. 2 illustrates an example of a wireless communications system 200 that supports techniques for configuring multiple SCGs in accordance with aspects of the present disclosure. The wireless communications system 200 may include a master node 205-a, a secondary node 205-b, and a UE 215. The nodes 205 may be examples of radio access nodes, such as base stations, eNBs, gNBs, network entities, and the like, such as described with reference to FIG. 1. The UE 215 may be an example of a UE 115 described with reference to FIG. 1. The wireless communications system 200 may support the use of a single configuration for multiple sequential conditional PSCell procedures performed by the UE 215.

The UE 215 may support dual connectivity in which the UE 215 has concurrent connections with multiple nodes 205. For example, the UE 215 may have a connection with the master node 205-a via one or more serving cells and may simultaneously have a connection with the secondary node 205-b via one or more serving cells. The master node 205-a and the secondary node 205-b operate using a same RAT. In other examples, the master node 205-a and the secondary node 205-b may operate using different RATs (e.g., the master node 205-a may operate using a first RAT and the secondary node 205-b may operate using a second, different RAT). The UE 215 may likewise support MR-DC in which the nodes 205 operate using different RATs. In some cases, the UE 215 may support EN-DC, NE-DC, and/or other types of dual connectivity deployments. In some examples, a serving cell may be referred to as a component carrier or other suitable terminology.

The master node 205-a may be associated with one or more serving cells that make up the MCG 220. For example, the master node 205-a may be associated with a PCell 210, which may be used for initial access and other types of procedures, and optionally one or more SCells. The secondary node 205-b may also be associated with one or more serving cells that make up the SCG 225. For example, the secondary node 205-b may be associated with a PSCell 230, which may be used for initial access and other types of procedures, and optionally one or more SCells. In some examples, the master node 205-a may provide the control plane connection to the core network and the secondary node 205-b may provide additional resources to the UE 215.

The master node 205-a may send the UE 215 a configuration for a conditional PSCell procedure (e.g., a CPA procedure, a CPC procedure) for adding a PSCell or changing the PSCell 230. The configuration for the conditional PSCell procedure may be sent before communication conditions degrade at the PSCell. Rather than applying the configuration for the conditional PSCell procedure right away (which the UE 215 may do for a configuration for a non-conditional PSCell procedure), the UE 215 may store the configuration and wait to apply the configuration until one or more triggering conditions associated with the conditional PSCell procedure are satisfied. In some examples, the UE 215 may be mobile, and as channel conditions change due to the mobility of the UE 215, one or more execution conditions may be satisfied, therefore triggering the conditional PSCell procedure. The execution conditions may be satisfied in other scenarios and may be based on measurements performed by the UE 215.

In some examples, the master node 205-a may also send the UE 215 a configuration for a handover procedure for handing over (e.g., changing) the PCell (e.g., from a source master node to a target master node). For example, the master node 205-a may transmit a configuration for a conditional handover procedure (CHO) that is triggered by the satisfaction of one or more triggering conditions, a non-conditional handover procedure that is triggered by a command from the master node 205-a, or a dual active protocol stack (DAPS) handover procedure that involves simultaneous reception of user data from the source master node and the target master node, among other types of handover procedures.

To enhance network efficiency and reduce signaling overhead, the techniques described herein enable the signaling of a single configuration that enables multiple conditional PSCell procedures by the UE 215. Specifically, the configuration may provide a set of configurations for two or more conditional PSCell changes and/or additions, thereby avoiding the need for additional configurations associated with subsequent conditional PSCell changes and/or additions after the UE 215 performs one conditional PSCell change/addition. Put another way, the UE 215 may receive a single configuration and perform a series or a sequence of conditional PSCell changes and/or additions using that single configuration.

For example, the master node 205-a may transmit, to the UE 215, a control message (e.g., an RRC reconfiguration message) indicating a configuration to perform a series of conditional procedures to establish connections with respective PSCells of one or more target secondary nodes. The configuration signaled by the control message may be referred to a multi-SCG configuration and may include respective SCG configurations associated with each PSCell to which the UE 215 may use to conditionally connect with multiple target secondary nodes (e.g., in a series of conditional PSCell procedures). The configuration may further include a set of execution conditions for one or more respective PSCell additions and/or changes. In some cases, the execution conditions may be determined by the master node 205-*a* or one or more target secondary nodes. In some aspects, the conditional PSCell procedures may be initiated by the master node 205-*a* (e.g., a source master node) or by the secondary node 205-*b* (e.g., a source secondary node).

The target PSCells indicated by the configuration may each correspond to a subset of target secondary nodes that are indicated by one or more secondary nodes. For instance, the master node 205-*a* may receive, from each target secondary node of a set of secondary nodes, an indication of a subset of one or more secondary nodes (e.g., one or more preferred secondary nodes). The subset of secondary nodes may be determined to be "preferred" by particular target secondary node based on, for example, a location or proximity with relation to the secondary node providing the indication. The master node 205-*a* may generate the configuration based on the subset of (preferred) secondary nodes. In some cases, the subset of secondary nodes may be associated with the master node 205-*a*. Additionally, or alternatively, the configuration may further include MCG configurations (e.g., if one or more target secondary nodes are associated with a different master node relative to the master node 205-*a*). In some cases, the configuration may include an indication that the configuration is to be used for the series of conditional PSCell procedures, and the UE 215 may store the configuration based on the indication. For instance, the UE 215 may retain (e.g., store, save) the configuration after each PSCell change or addition. When performing the series of conditional PSCell procedures, the UE 215 may retrieve the stored configuration for each conditional PSCell procedure of the series of conditional PSCell procedures. In some examples, after performing one or more PSCell changes/additions, the UE 215 may receive supplementary or additional information (e.g., updated measurement configurations, execution conditions) for subsequent PSCell changes/additions of the series of conditional PSCell procedures.

Prior to generating the single configuration for the series of conditional PSCell procedures, the master node 205-*a* may obtain information, such as SCG configurations, from each target secondary node regarding one or more prepared PSCells that may be used for the series of conditional PSCell procedures. For instance, after indicating the subset of secondary nodes, each target secondary node may signal, to the master node 205-*a*, the SCG configurations associated with each prepared PSCell of the secondary node. In some cases, each target secondary node may indicate a set of execution conditions for each prepared PSCell. Additionally, or alternatively, each target secondary node may indicate modified (e.g., updated) measurement configurations for each prepared PSCell. In any case, the master node 205-*a* may use the information received from one or more target secondary nodes to generate the single configuration for the UE 215. In some examples, an SCG configuration of a target PSCell may not depend on a source PSCell (e.g., PSCell 230). In such cases, the master node 205-*a* may send, to the UE 215, a same full SCG configuration for a target PSCell that is independent of the source PSCell.

Additionally, or alternatively, an SCG configuration of a target PSCell may depend on the source PSCell, which may be based on resources provided to the UE 215. In such cases, different full SCG configurations for a target PSCell depending on the source PSCell may be included in the configuration signaled to the UE 215 for the series of conditional PSCell procedures. As an example, the master node 205-*a* may initiate PSCell preparations with the set of target secondary nodes. Upon receiving information from the target secondary nodes regarding prepared PSCells and the subset of (preferred) secondary nodes, the master node 205-*a* may perform secondary node modification procedures with the subset of secondary nodes (e.g., for each SN). In a message (e.g., a secondary node modification request message) sent to the subset of secondary nodes, master node 205-*a* may include configurations of prepared PSCells indicated as source configurations. In a response message (e.g., a secondary node modification request acknowledgment message) to the master node 205-*a*, a target secondary node may provide the target PSCell configuration(s). In some examples, a target secondary node may further indicate, for a target PSCell, whether the SCG configuration depends on the source PSCell (e.g., indicated by the master node 205-*a* in the secondary node modification request message). In some aspects, if the SCG configuration is not dependent on the source PSCell, no SCG configuration may be provided by the target secondary node.

As an illustrative example of the single configuration provided to the UE 215 for the sequence of conditional PSCell procedures, the UE 215 may receive configurations associated with multiple (e.g., eight) prepared PSCells. In this example, there may be a threshold number of configurations (e.g., 8+8×8=72 configurations) associated with the configuration signaled by the control message receive by the UE 215. The configurations may correspond to one or more PSCell configurations (e.g., a configuration for a first target PSCell, configT-PSCell1), which may further include individual configurations for given combinations of PSCells (e.g., configurations between a second target PSCell, T-PSCell2, and the first target PSCell, config(2, 1); configurations between a source PSCell and a first target PSCell, config(src, 1); and the like).

An exemplary configuration is provided below in Table 1. It should be noted, however, that Table 1 merely exemplifies an example of such a multi-SCG configuration, and should not be interpreted as limiting a given multi-SCG configuration to the format, field information, or the like, given within Table 1.

TABLE 1

| configT-PSCell1 | config (2, 1) |
| | config (3, 1) |
| | . . . |
| | config (8, 1) |
| | config (src, 1) |
| configT-PSCell2 | config (1, 2) |
| | config (3, 2) |
| | . . . |
| | config (8, 2) |
| | config (src, 2) |
| | . . . |

In the example of Table 1, config (i, j) may denote a first configuration of a target PSCell (e.g., target PSCell i, T-PSCelli) with respect to a second configuration of another target PSCell (e.g., target PSCell j, T-PSCellj). Further, config (src, j) may denote a configuration of a source PSCell (e.g., source PSCell, src) with respect to a target PSCell (e.g., target PSCell j, T-PSCellj). Here, if each target secondary node indicates that the UE 215 performs the conditional PSCell change/addition to only a subset of the target secondary nodes (e.g., the preferred secondary nodes), then an overall number of configurations provided to the UE 215 may be reduced. Further, the amount of information signaled between the respective secondary nodes and the master node 205-*a* may be similarly reduced, thereby enhancing efficiencies in the wireless communications system 200.

One or more PSCells for which the UE 215 performs the conditional PSCell procedures for may be associated with the same or different secondary nodes. For example, the UE 215 may establish a connection with a first target PSCell associated with a first secondary node as part of a first conditional PSCell procedure of the series of conditional PSCell procedures. Then, the UE 215 may establish a connection with a second, different PSCell as part of a second conditional PSCell procedure of the series of conditional PSCell procedures. In some cases, the second PSCell may be associated with the first secondary node (e.g., the second PSCell may have been prepared by the first secondary node, and therefore configured by the master node 205-*a*). In other examples, the second PSCell may be associated with a second secondary node different from the first secondary node.

Thus, as described herein, the multi-SCG configuration may include CPC and/or CPA configurations and execution conditions associated with one or more target secondary nodes. The multi-SCG configuration may be based on indications of target PSCells associated with preferred secondary nodes. That is, the one or more target secondary nodes may determine, based on one or more metrics, a subset of available secondary nodes that may provide relatively robust communications for the UE 215. The preferred secondary nodes may reduce the multi-SCG configuration to a subset of the target secondary nodes (e.g., target PSCells), which may reduce an overall number of available configurations as well as reduce signaling in subsequent cell change procedures. In some examples, the subset of secondary nodes (e.g., the preferred secondary nodes) may be selected based on prior connections associated with the UE 215, the master node 205-*a*, and the like. In some examples, the multi-SCG configuration (e.g., for a CPC, CPA, or both) may further include an indication that the multi-SCG configuration may be applicable for a sequence of PSCell additions or changes, a series of PSCell additions or changes, or both. Based on such an indication, the UE 215 may store the multi-SCG configuration after a PSCell change or addition for each subsequent PSCell change or addition.

Figure 3:
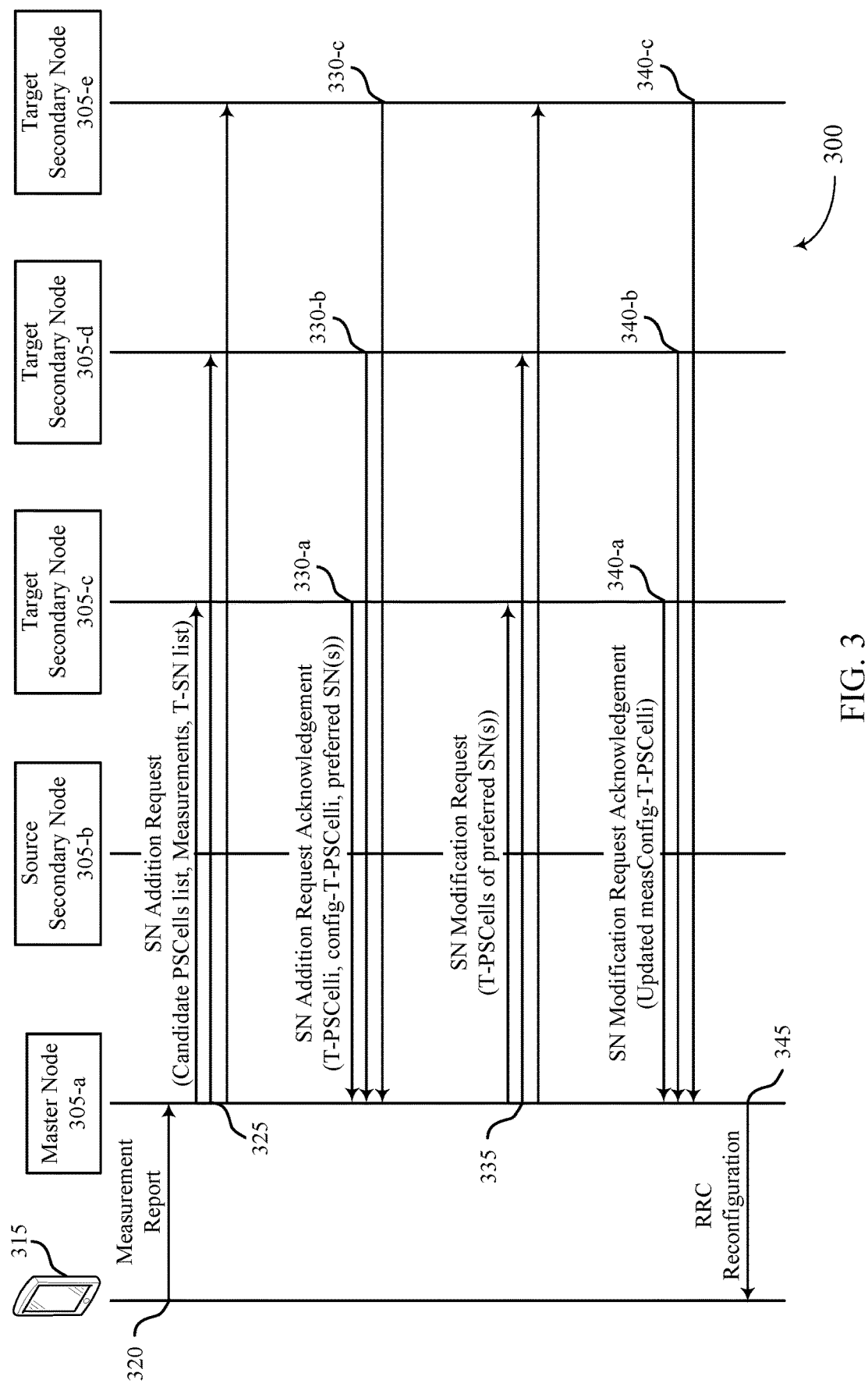
FIGS. 3 through 8 illustrate examples of process flows in systems that supports techniques for configuring multiple SCGs in accordance with aspects of the present disclosure.

FIG. 3 illustrates an example of a process flow 300 in a system that supports techniques for configuring multiple SCGs in accordance with aspects of the present disclosure. In some examples, the process flow 300 may be related to aspects of the wireless communications system 100 or the wireless communications system 200. For example, the process flow 300 may be implemented by a master node 305-*a*, a secondary node 305-*b* (e.g., a source secondary node), one or more target secondary nodes 305 (e.g., secondary node 305-*c*, secondary node 305-*d*, secondary node 305-*e*), and a UE 315, which may be examples of master nodes, secondary nodes, and a UE as described herein. The UE 315 may have dual connectivity with the master node 305-*a* (e.g., via a PCell, which may be associated with an MCG) and the secondary node 305-*b* (e.g., via a PSCell, which may be associated with a SCG). The process flow 300 may illustrate operations for configuring a single configuration for the UE 315 to perform a series of conditional PSCell changes and/or additions.

The process flow 300 may correspond to a source master node-initiated conditional PSCell procedure (e.g., a CPA or CPC initiated by the master node 305-*a*), which may be referred to as master node-initiated inter-secondary node CPC, master node-initiated inter-secondary node CPA, or some similar terminology. The master node 305-*a* may initiate the conditional PSCell procedure based on one or more measurements. For instance, at 320, the UE 315 may transmit, to the master node 305-*a*, a measurement report including results of one or more measurements performed by the UE 315.

Based on the measurement report, the master node 305-*a* may determine to initiate a conditional PSCell procedure (e.g., CPA, CPC). For example, at 325, the master node 305-*a* may transmit respective first messages (e.g., secondary node addition request messages) to each of the target secondary nodes 305 (e.g., to secondary node 305-*c*, 305-*d*, and/or 305-*e*). Each of the first messages transmitted at 325 may include a list of candidate PSCells, a list of PSCells identifiers, a list of target secondary nodes (e.g., a T-SN list) included in a set of target secondary nodes 305 (e.g., secondary nodes 305-*c*, 305-*d*, and/or 305-*e*), measurements from the measurement report, or a combination thereof. In such cases, the first message transmitted at 325 to each target secondary node 305 may include a respective identifier for each target secondary node 305 included in the set of target secondary nodes 305.

At 330, in response to the first message from the master node 305-*a*, each secondary node 305 may transmit a second message (e.g., a secondary node addition requests acknowledgment) to the master node 305-*a*. For example, at 330-*a*, the secondary node 305-*c* may transmit a first secondary node addition request acknowledgment message to the master node 305-*a*. Similarly, at 330-*b* and 330-*c*, the secondary nodes 305-*d* and 305-*e* may transmit a second and a third addition request acknowledgment message, respectively, to the master node 305-*a*. A secondary node addition request acknowledgment message from a secondary node 305 may include an indication of one or more target PSCells (e.g., T-PSCelli) associated with the secondary node 305 and respective SCG configurations of the one or more target PSCells (e.g., config-T-PSCelli). In some examples, such as those described by the present disclosure, each secondary node 305-*c*, 305-*d*, and/or 305-*e* may include an indication of a subset of secondary nodes (e.g., preferred secondary nodes) based on the list of secondary nodes received from the master node 305-*a*.

As an illustrative example, the secondary node 305-*c* may indicate, in the second message, that one or both of secondary nodes 305-*d* or 305-*e* are preferred secondary nodes 305, which may be based on a location of the respective secondary nodes 305-*d* or 305-*e*, a proximity of the respective secondary nodes 305-*d* or 305-*e* to secondary node 305-*c*, one or more other parameters, or any combination thereof. The subset of secondary nodes 305 may be selected from the set of secondary nodes 305 indicated by the master node 305-*a*. The subset of secondary nodes may be identified for upcoming conditional PSCell procedures by the UE 315. As such, a target secondary node may indicate a preferred set of secondary nodes for PSCell change/addition during a preparation procedure.

At 335, based on the respective second messages (e.g., the secondary node addition request acknowledgment messages) received from the target secondary nodes 305, the master node 305-*a* may transmit a third message (e.g., a secondary node modification request message) to each of the target secondary nodes 305-*c*, 305-*d*, and 305-*e*. The third message may indicate, to a target secondary node, the prepared target PSCells of the subset of target secondary nodes 305 (e.g., the PSCells of the preferred secondary nodes).

At 340, the target secondary nodes 305-c, 305-d, and 305-e may each transmit, in response to the third message received from the master node 305-a, a fourth message (e.g., a secondary node modification request acknowledgment message) to the master node 305-a. For example, at 340-a, the secondary node 305-c may transmit a first secondary node modification request acknowledgment message. Similarly, at 340-b and 340-c, the secondary nodes 305-d and 305-e may each transmit a second and a third secondary node modification request acknowledgment messages, respectively, to the master node 305-a. The fourth message from each of the secondary nodes 305-c, 305-d, and 305-e may include a set of measurement configurations (e.g., updated measurement configurations, measConfig-T-PS-Celli) associated with prepared PSCells of the respective secondary nodes 305. That is, a target secondary node 305 may provide measurement configurations (e.g., optimized measurement configurations) associated with its prepared PSCells based on information provided by the master node 305-a (e.g., a source master node) on prepared PSCells of the preferred secondary nodes.

Based on the information received from the secondary nodes (e.g., the set of secondary nodes or the preferred secondary nodes), at 345, the master node 305-a may transmit a control message (e.g., an RRC reconfiguration message) including a CPC configuration, a CPA configuration, or both, to the UE 315. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 305-a may provide, for each prepared PSCell, execution conditions for PSCell change/addition to target PSCells.

In some aspects, the master node 305-a may provide, within the configuration signaled at 345, the execution conditions for possible PSCell changes based on the preferred secondary nodes for each target secondary node 305. In the example of FIG. 3, one PSCell (T-PSCelli) may be prepared by each target secondary node 305. Here, config-T-PSCelli may denote an SCG configuration associated with T-PSCelli. For a prepared PSCell, a full SCG configuration may be provided and signaled to the UE 315. Additionally, or alternatively, a delta SCG configuration with respect to a source PSCell configuration may be provided.

Upon receiving the configuration (e.g., CPC configuration, CPA configuration) from the master node 305-a, the UE 315 stores the full configuration for all prepared PSCells. As such, the stored information included in the configuration may be used to perform a series of CPA procedures, CPC procedures, or the like, which may be based on the SCG configurations, the MCG configurations, the set of execution conditions being satisfied, or a combination thereof. For example, the UE 315 may perform a first PSCell conditional procedure based on a first set of execution conditions to a first target PSCell (e.g., which may be associated with a source secondary node or a target secondary node), followed by a second PSCell conditional procedure to a second target PSCell (e.g., which may be associated with a source secondary node or a target secondary node) based on a second set of execution conditions.

Figure 4:
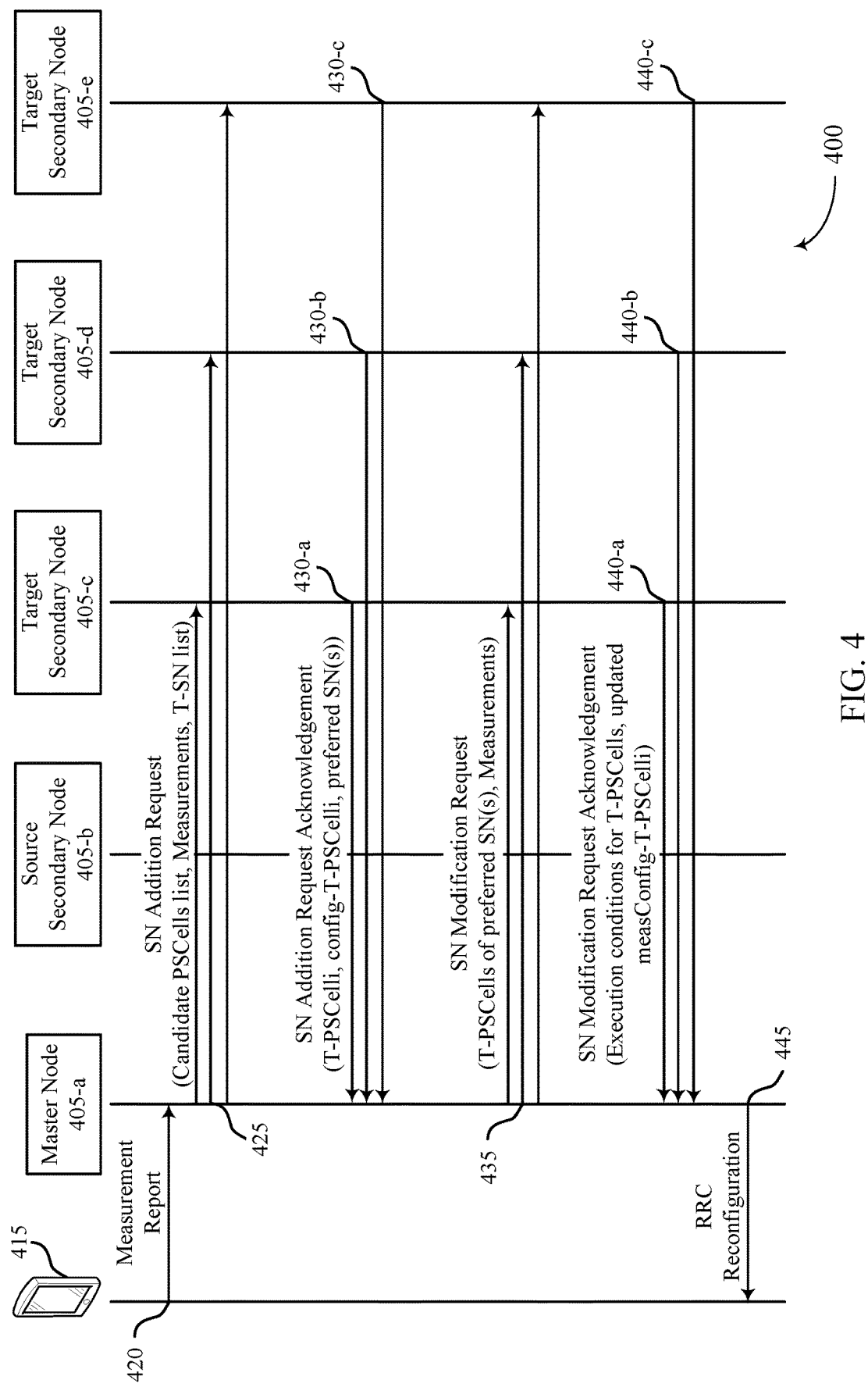

FIG. 4 illustrates an example of a process flow 400 that supports techniques for configuring multiple SCGs in accordance with aspects of the present disclosure. In some examples, the process flow 400 may be related to aspects of the wireless communications system 100 or the wireless communications system 200. For example, the process flow 400 may be implemented by a master node 405-a, a secondary node 405-b (e.g., a source secondary node), one or more target secondary nodes 405 (e.g., secondary node 405-c, secondary node 405-d, secondary node 405-e), and a UE 415, which may be examples of master nodes, secondary nodes, and a UE as described herein. The UE 415 may have dual connectivity with the master node 405-a (e.g., via a PCell, which may be associated with an MCG) and the secondary node 405-b (e.g., via a PSCell, which may be associated with a SCG). The process flow 400 may illustrate operations for configuring a single configuration for the UE 415 to perform a series of conditional PSCell changes and/or additions.

The process flow 400 may correspond to a source master node-initiated conditional PSCell procedure (e.g., a CPA or CPC initiated by the master node 405-a), which may be referred to as master node-initiated inter-secondary node CPC, master node-initiated inter-secondary node CPA, or some similar terminology. The master node 405-a may initiate the conditional PSCell procedure based on one or more measurements. For instance, at 420, the UE 415 may transmit, to the master node 405-a, a measurement report including results of one or more measurements performed by the UE 415.

Based on the measurement report, the master node 405-a may determine to initiate a conditional PSCell procedure (e.g., CPA, CPC). For example, at 425, the master node 405-a may transmit respective first messages (e.g., secondary node addition request messages) to each of the target secondary nodes 405 (e.g., to secondary node 405-c, 405-d, and/or 405-e). Each of the first messages transmitted at 425 may include a list of candidate PSCells, a list of PSCells identifiers, a list of target secondary nodes (e.g., a T-SN list) included in a set of target secondary nodes 405 (e.g., secondary nodes 405-c, 405-d, and/or 405-e), measurements from the measurement report, or a combination thereof. In such cases, the first message transmitted at 425 to each target secondary node 405 may include a respective identifier for each target secondary node 405 included in the set of target secondary nodes 405.

At 430, in response to the first message from the master node 405-a, each secondary node 405 may transmit a second message (e.g., a secondary node addition requests acknowledgment) to the master node 405-a. For example, at 430-a, the secondary node 405-c may transmit a first secondary node addition request acknowledgment message to the master node 405-a. Similarly, at 430-b and 430-c, the secondary nodes 405-d and 405-e may transmit a second and a third addition request acknowledgment message, respectively, to the master node 405-a. A secondary node addition request acknowledgment message from a secondary node 405 may include an indication of one or more target PSCells (e.g., T-PSCelli) associated with the secondary node 405 and respective SCG configurations of the one or more target PSCells (e.g., config-T-PSCelli). In some examples, such as those described by the present disclosure, each secondary node 405-c, 405-d, and/or 405-e may include an indication of a subset of secondary nodes (e.g., preferred secondary nodes) based on the list of secondary nodes received from the master node 405-a.

For instance, the secondary node 405-c may indicate, in the second message, that one or both of secondary nodes 405-d or 405-e are preferred secondary nodes 405, which may be based on a location of the respective secondary nodes 405-*d* or 405-*e*, a proximity of the respective secondary nodes 405-*d* or 405-*e* to secondary node 405-*c*, one or more other parameters, or any combination thereof. The subset of secondary nodes 405 may be selected from the set of secondary nodes 405 indicated by the master node 405-*a*. The subset of secondary nodes may be identified for upcoming conditional PSCell procedures by the UE 415. As such, a target secondary node may indicate a preferred set of secondary nodes for PSCell change/addition during a preparation procedure.

At 435, based on the respective second messages (e.g., the secondary node addition request acknowledgment messages) received from the target secondary nodes 405, the master node 405-*a* may transmit a third message (e.g., a secondary node modification request message) to each of the target secondary nodes 405-*c*, 405-*d*, and 405-*e*. The third message may indicate, to each target secondary node 405, the prepared target PSCells of the subset of target secondary nodes 405 (e.g., the PSCells of the preferred secondary nodes). Additionally, the third message may include an indication of measurements (e.g., received from the UE 415) for the target PSCells of the secondary nodes 405.

At 440, the target secondary nodes 405-*c*, 405-*d*, and 405-*e* may each transmit, in response to the third message received from the master node 405-*a*, a fourth message (e.g., a secondary node modification request acknowledgment message) to the master node 405-*a*. For example, at 440-*a*, the secondary node 405-*c* may transmit a first secondary node modification request acknowledgment message. Similarly, at 440-*b* and 440-*c*, the secondary nodes 405-*d* and 405-*e* may each transmit a second and a third secondary node modification request acknowledgment messages, respectively, to the master node 405-*a*. The fourth message from each of the secondary nodes 405-*c*, 405-*d*, and 405-*e* may include a set of measurement configurations (e.g., updated measurement configurations, measConfig-T-PS-Celli) associated with prepared PSCells of the respective secondary nodes 405. That is, a target secondary node 405 may provide measurement configurations (e.g., optimized measurement configurations) associated with its prepared PSCells based on information provided by the master node 405-*a* (e.g., a source master node) on prepared PSCells of the preferred secondary nodes.

In some aspects, a secondary node 405 may determine execution conditions for the series of conditional PSCell procedures. For example, each secondary node 405 may indicate, within the fourth message at 440 (e.g., the secondary node modification request acknowledgment message), the execution conditions for possible PSCell changes to or additions of target PSCells of preferred secondary nodes based on information provided by the master node 405-*a* (e.g., a source master node) on prepared PSCells of the subset of secondary nodes 405 (e.g., the preferred secondary nodes). Thus, in the example of FIG. 4, a target secondary node (target secondary node 405-*c*, 405-*d*, and/or 405-*e*) may provide execution conditions for PSCell change to target PSCells as well as measurement configurations associated with its prepared PSCells.

Based on the information received from the secondary nodes (e.g., the set of secondary nodes or the preferred secondary nodes), at 445, the master node 405-*a* may transmit a control message (e.g., an RRC reconfiguration message) including a CPC configuration, a CPA configuration, or both, to the UE 415. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 405-*a* may provide, for each prepared PSCell, execution conditions for PSCell change/addition to target PSCells.

When the UE 415 receives the configuration (e.g., CPC configuration, CPA configuration) from the master node 405-*a*, the UE 415 stores the full configurations for all prepared PSCells. In some examples, the configuration may be stored after a conditional PSCell procedure is performed. As such, the stored information included in the configuration may be used to perform a series of CPA procedures, CPC procedures, or the like, which may be based on the SCG configurations, the MCG configurations, the set of execution conditions being satisfied, or a combination thereof. For example, the UE 415 may perform a first PSCell conditional procedure based on a first set of execution conditions to a first target PSCell (e.g., which may be associated with a source secondary node or a target secondary node), followed by a second PSCell conditional procedure to a second target PSCell (e.g., which may be associated with a source secondary node or a target secondary node) based on a second set of execution conditions.

Figure 5:
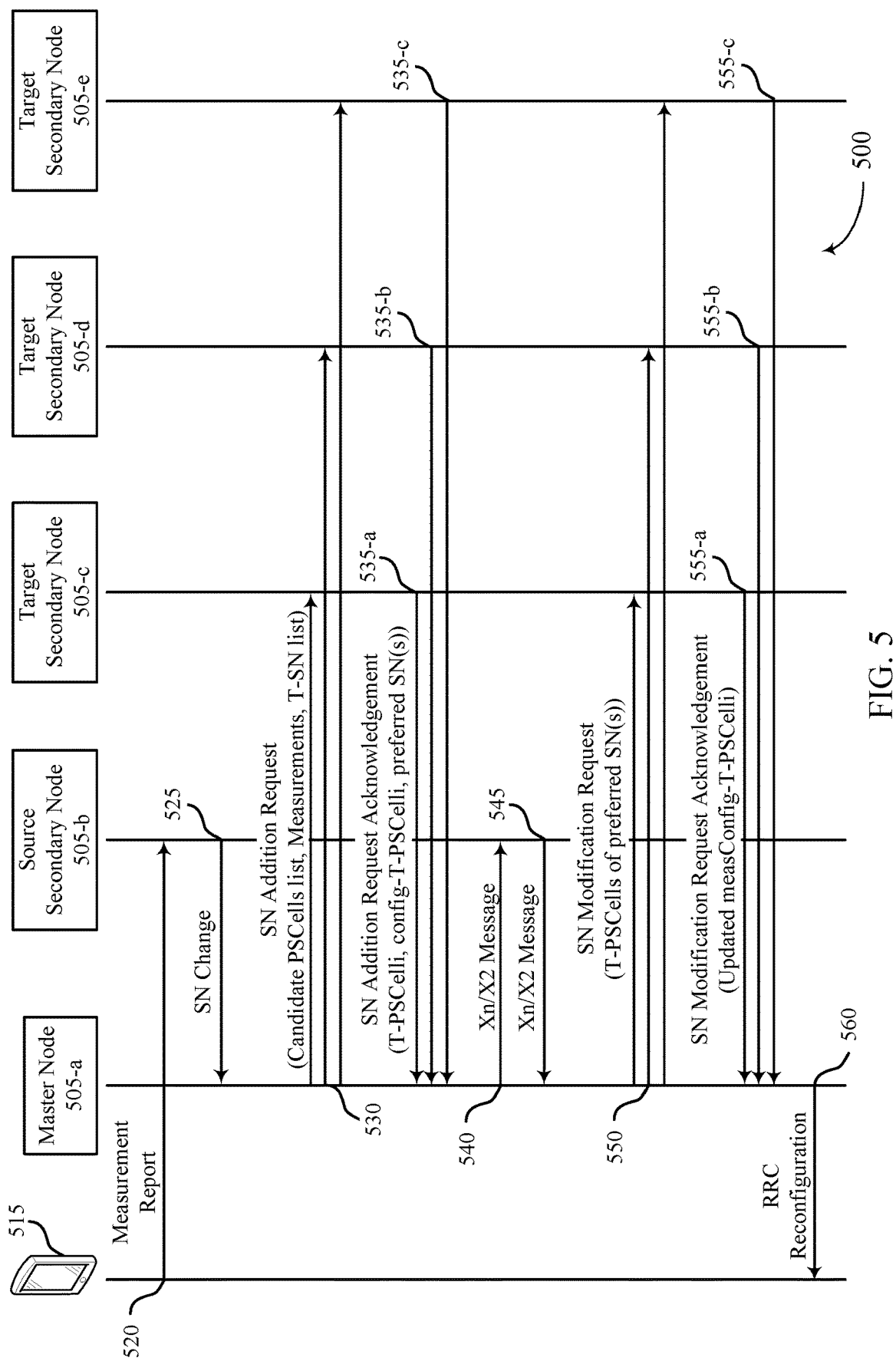

FIG. 5 illustrates an example of a process flow 500 that supports techniques for configuring multiple SCGs in accordance with aspects of the present disclosure. In some examples, the process flow 500 may be related to aspects of the wireless communications system 100 or the wireless communications system 200. For example, the process flow 500 may be implemented by a master node 505-*a*, a secondary node 505-*b* (e.g., a source secondary node), one or more target secondary nodes 505 (e.g., secondary node 505-*c*, secondary node 505-*d*, secondary node 505-*e*), and a UE 515, which may be examples of master nodes, secondary nodes, and a UE as described herein. The UE 515 may have dual connectivity with the master node 505-*a* (e.g., via a PCell, which may be associated with an MCG) and the secondary node 505-*b* (e.g., via a PSCell, which may be associated with a SCG). The process flow 500 may illustrate operations for configuring a single configuration for the UE 515 to perform a series of conditional PSCell changes and/or additions.

The process flow 500 may correspond to a secondary node-initiated conditional PSCell procedure (e.g., a CPA or CPC initiated by the secondary node 505-*b*), which may be referred to as secondary node-initiated inter-secondary node CPC, secondary node-initiated inter-secondary node CPA, or some similar terminology. As such, the secondary node 505-*b* may initiate the conditional PSCell procedure based on one or more measurements. For instance, at 520, the UE 515 may transmit, to the secondary node 505-*b*, a measurement report including results of one or more measurements performed by the UE 515.

Based on the measurement report, the secondary node 505-*b* may determine to initiate a conditional PSCell procedure (e.g., CPA, CPC). For example, at 525, the secondary node 505-*b* may transmit, to the master node 505-*a*, a message (e.g., a secondary node change required message) that initiates the conditional PSCell procedure. The message may include, for example, a list of target secondary nodes 505 (e.g., a T-SN list), a list of candidate PSCells, measurements (e.g., from the measurement report), execution conditions for performing a series of conditional PSCell changes/additions, or any combination thereof. In the example of FIG. 5, the secondary node 505-*b* may determine the execution conditions for the series of conditional PSCell procedures.

At 530, in response to receiving the message from the secondary node 505-*b*, the master node 505-*a* may transmit respective first messages (e.g., secondary node addition request messages) to each of the target secondary nodes 505 (e.g., to secondary node 505-*c*, 505-*d*, and/or 505-*e*) based on the initiated conditional PSCell procedure. Each of the first messages transmitted at 525 may include the list of candidate PSCells and/or PSCells identifiers, the list of target secondary nodes (e.g., the T-SN list) included in a set of target secondary nodes 505 (e.g., secondary nodes 505-*c*, 505-*d*, and/or 505-*e*), measurements, or a combination thereof. In such cases, the first message transmitted at 530 to each target secondary node 505 may include a respective identifier for each target secondary node 505 included in the set of target secondary nodes 505.

At 535, in response to the first message from the master node 505-*a*, each secondary node 505 may transmit a second message (e.g., a secondary node addition requests acknowledgment) to the master node 505-*a*. For example, at 535-*a*, the secondary node 505-*c* may transmit a first secondary node addition request acknowledgment message to the master node 505-*a*. Similarly, at 535-*b* and 535-*c*, the secondary nodes 505-*d* and 505-*e* may transmit a second and a third addition request acknowledgment message, respectively, to the master node 505-*a*. A secondary node addition request acknowledgment message from a secondary node 505 may include an indication of one or more target PSCells (e.g., T-PSCelli) associated with the secondary node 505 and respective SCG configurations of the one or more target PSCells (e.g., config-T-PSCelli). In some examples, such as those described by the present disclosure, each secondary node 505-*c*, 505-*d*, and/or 505-*e* may include an indication of a subset of secondary nodes (e.g., preferred secondary nodes) based on the list of secondary nodes received from the master node 505-*a*.

For example, the secondary node 505-*c* may indicate, in the second message, that one or both of secondary nodes 505-*d* or 505-*e* are preferred secondary nodes 505, which may be based on a location of the respective secondary nodes 505-*d* or 505-*e*, a proximity of the respective secondary nodes 505-*d* or 505-*e* to secondary node 505-*c*, one or more other parameters, or any combination thereof. The subset of secondary nodes 505 may be selected from the set of secondary nodes 505 indicated by the master node 505-*a*. The subset of secondary nodes may be identified for upcoming conditional PSCell procedures by the UE 515. As such, a target secondary node may indicate a preferred set of secondary nodes for PSCell change/addition during a preparation procedure.

At 540, after receiving the respective second messages from each target secondary node 505, the master node 505-*a* may transmit a message (e.g., a message over an Xn interface or an X2 interface) that includes an indication of a set of prepared PSCells for the series of conditional PSCell procedures. For example, the set of prepared PSCells may be based on the information received from each secondary node 505, such as the subset of secondary nodes (e.g., the preferred set of secondary nodes) and corresponding the SCG configurations provided by the secondary nodes 505.

At 545, the secondary node 505-*b* may transmit, to the master node 505-*a*, another message (e.g., a message over the Xn interface or the X2 interface) that includes an indication of a source measurement configuration (e.g., an updated source measurement configuration, srcMeasConfig) . In some cases, the message from the secondary node 505-*b* at 545 may include execution conditions for performing a series of conditional PSCell changes, conditional PSCell additions, or both.

At 550, based on the respective second messages (e.g., the secondary node addition request acknowledgment messages) received from the target secondary nodes 505 and the message from the secondary node 505-*b* at 545, the master node 505-*a* may transmit a third message (e.g., a secondary node modification request message) to each of the target secondary nodes 505-*c*, 505-*d*, and 505-*e*. The third message may indicate, to a target secondary node, the prepared target PSCells of the subset of target secondary nodes 505 (e.g., the PSCells of the preferred secondary nodes).

At 555, the target secondary nodes 505-*c*, 505-*d*, and 505-*e* may each transmit, in response to the third message received from the master node 505-*a*, a fourth message (e.g., a secondary node modification request acknowledgment message) to the master node 505-*a*. For example, at 555-*a*, the secondary node 505-*c* may transmit a first secondary node modification request acknowledgment message. Similarly, at 555-*b* and 555-*c*, the secondary nodes 505-*d* and 505-*e* may each transmit a second and a third secondary node modification request acknowledgment messages, respectively, to the master node 505-*a*. The fourth message from each of the secondary nodes 505-*c*, 505-*d*, and 505-*e* may include a set of measurement configurations (e.g., updated measurement configurations, measConfig-T-PS-Celli) associated with prepared PSCells of the respective secondary nodes 505. That is, a target secondary node 505 may provide measurement configurations (e.g., optimized measurement configurations) associated with its prepared PSCells based on information provided by the master node 505-*a* (e.g., a source master node) on prepared PSCells of the preferred secondary nodes.

Based on the information received from the secondary nodes 505 (e.g., the set of secondary nodes or the preferred secondary nodes), at 560, the master node 505-*a* may transmit a control message (e.g., an RRC reconfiguration message) including a CPC configuration, a CPA configuration, or both, to the UE 515. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 505-*a* may provide, for each prepared PSCell, execution conditions for PSCell change/addition to target PSCells.

When the UE 515 receives the configuration (e.g., CPC configuration, CPA configuration) from the master node 505-*a*, the UE 515 may store the full configurations for all prepared PSCells for subsequent PSCell changes and additions. As such, the stored information included in the configuration may be used to perform a series of CPA procedures, CPC procedures, or the like, which may be based on the SCG configurations, the MCG configurations, the set of execution conditions being satisfied, or a combination thereof. For example, the UE 515 may perform a first PSCell conditional procedure based on a first set of execution conditions to a first target PSCell (e.g., which may be associated with a source secondary node or a target secondary node), followed by a second PSCell conditional procedure to a second target PSCell (e.g., which may be associated with a source secondary node or a target secondary node) based on a second set of execution conditions.

Figure 6:
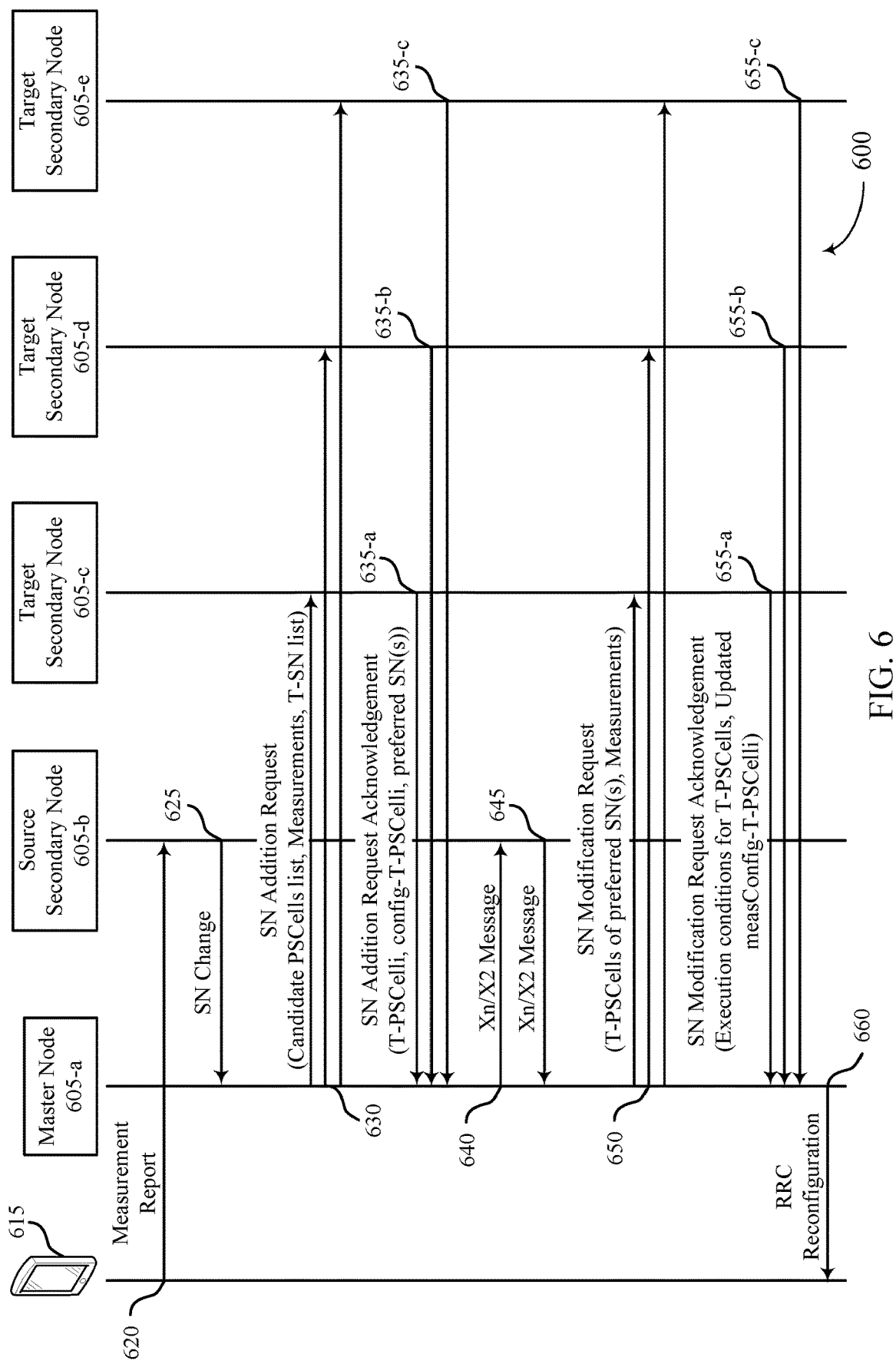

FIG. 6 illustrates an example of a process flow 600 that supports techniques for configuring multiple SCGs in accordance with aspects of the present disclosure. In some examples, the process flow 600 may be related to aspects of the wireless communications system 100 or the wireless communications system 200. For example, the process flow 600 may be implemented by a master node 605-a, a secondary node 605-b (e.g., a source secondary node), one or more target secondary nodes 605 (e.g., secondary node 605-c, secondary node 605-d, secondary node 605-e), and a UE 615, which may be examples of master nodes, secondary nodes, and a UE as described herein. The UE 615 may have dual connectivity with the master node 605-a (e.g., via a PCell, which may be associated with an MCG) and the secondary node 605-b (e.g., via a PSCell, which may be associated with a SCG). The process flow 600 may illustrate operations for configuring a single configuration for the UE 615 to perform a series of conditional PSCell changes and/or additions.

The process flow 600 may correspond to a secondary node-initiated conditional PSCell procedure (e.g., a CPA or CPC initiated by the secondary node 605-b), which may be referred to as secondary node-initiated inter-secondary node CPC, secondary node-initiated inter-secondary node CPA, or some similar terminology. As such, the secondary node 605-b may initiate the conditional PSCell procedure based on one or more measurements. For instance, at 620, the UE 615 may transmit, to the secondary node 605-b, a measurement report including results of one or more measurements performed by the UE 615.

Based on the measurement report, the secondary node 605-b may determine to initiate a conditional PSCell procedure (e.g., CPA, CPC). For example, at 625, the secondary node 605-b may transmit, to the master node 605-a, a message (e.g., a secondary node change required message) that initiates the conditional PSCell procedure. The message may include, for example, a list of target secondary nodes 605 (e.g., a T-SN list), a list of candidate PSCells, measurements (e.g., from the measurement report), execution conditions for performing a series of conditional PSCell changes/additions, or any combination thereof. In the example of FIG. 6, the secondary node 605-b may determine the execution conditions for the series of conditional PSCell procedures.

At 630, in response to receiving the message from the secondary node 605-b, the master node 605-a may transmit respective first messages (e.g., secondary node addition request messages) to each of the target secondary nodes 605 (e.g., to secondary node 605-c, 605-d, and/or 605-e) based on the initiated conditional PSCell procedure. Each of the first messages transmitted at 625 may include the list of candidate PSCells and/or PSCells identifiers, the list of target secondary nodes (e.g., the T-SN list) included in a set of target secondary nodes 605 (e.g., secondary nodes 605-c, 605-d, and/or 605-e), measurements, or a combination thereof. In such cases, the first message transmitted at 630 to each target secondary node 605 may include a respective identifier for each target secondary node 605 included in the set of target secondary nodes 605.

At 635, in response to the first message from the master node 605-a, each secondary node 605 may transmit a second message (e.g., a secondary node addition requests acknowledgment) to the master node 605-a. For example, at 635-a, the secondary node 605-c may transmit a first secondary node addition request acknowledgment message to the master node 605-a. Similarly, at 635-b and 635-c, the secondary nodes 605-d and 605-e may transmit a second and a third addition request acknowledgment message, respectively, to the master node 605-a. A secondary node addition request acknowledgment message from a secondary node 605 may include an indication of one or more target PSCells (e.g., T-PSCelli) associated with the secondary node 605 and respective SCG configurations of the one or more target PSCells (e.g., config-T-PSCelli). In some examples, such as those described by the present disclosure, each secondary node 605-c, 605-d, and/or 605-e may include an indication of a subset of secondary nodes (e.g., preferred secondary nodes) based on the list of secondary nodes received from the master node 605-a.

As an illustrative example, the secondary node 605-c may indicate, in the second message, that one or both of secondary nodes 605-d or 605-e are preferred secondary nodes 605, which may be based on a location of the respective secondary nodes 605-d or 605-e, a proximity of the respective secondary nodes 605-d or 605-e to secondary node 605-c, one or more other parameters, or any combination thereof. The subset of secondary nodes 605 may be selected from the set of secondary nodes 605 indicated by the master node 605-a. The subset of secondary nodes may be identified for upcoming conditional PSCell procedures by the UE 615. As such, a target secondary node may indicate a preferred set of secondary nodes for PSCell change/addition during a preparation procedure.

At 640, after receiving the respective second messages from each target secondary node 605, the master node 605-a may transmit a message (e.g., a message over an Xn interface or an X2 interface) that includes an indication of a set of prepared PSCells for the series of conditional PSCell procedures. For example, the set of prepared PSCells may be based on the information received from each secondary node 605, such as the subset of secondary nodes (e.g., the preferred set of secondary nodes) and corresponding the SCG configurations provided by the secondary nodes 605.

At 645, the secondary node 605-b may transmit, to the master node 605-a, another message (e.g., a message over the Xn interface or the X2 interface) that includes an indication of a source measurement configuration (e.g., an updated source measurement configuration, srcMeasConfig).

At 650, based on the respective second messages (e.g., the secondary node addition request acknowledgment messages) received from the target secondary nodes 605 and the message from the secondary node 605-b at 645, the master node 605-a may transmit a third message (e.g., a secondary node modification request message) to each of the target secondary nodes 605-c, 605-d, and 605-e. The third message may indicate, to a target secondary node, the prepared target PSCells of the subset of target secondary nodes 605 (e.g., the PSCells of the preferred secondary nodes). Additionally, the third message may include an indication of measurements (e.g., received from the UE 415) for the target PSCells of the secondary nodes 605.

At 655, the target secondary nodes 605-c, 605-d, and 605-e may each transmit, in response to the third message received from the master node 605-a, a fourth message (e.g., a secondary node modification request acknowledgment message) to the master node 605-a. For example, at 655-a, the secondary node 605-c may transmit a first secondary node modification request acknowledgment message. Similarly, at 655-b and 655-c, the secondary nodes 605-d and 605-e may each transmit a second and a third secondary node modification request acknowledgment messages, respectively, to the master node 605-*a*. The fourth message from each of the secondary nodes 605-*c*, 605-*d*, and 605-*e* may include a set of measurement configurations (e.g., updated measurement configurations, measConfig-T-PSCelli) associated with prepared PSCells of the respective secondary nodes 605. That is, a target secondary node 605 may provide measurement configurations (e.g., optimized measurement configurations) associated with its prepared PSCells based on information provided by the master node 605-*a* (e.g., a source master node) on prepared PSCells of the preferred secondary nodes.

In some aspects, a secondary node 605 may determine execution conditions for the series of conditional PSCell procedures. For example, each secondary node 605 may indicate, within the fourth message at 655 (e.g., the secondary node modification request acknowledgment message), the execution conditions for possible PSCell changes based on information provided by the master node 605-*a* (e.g., a source master node) on prepared PSCells of the subset of secondary nodes 605 (e.g., the preferred secondary nodes). Thus, in the example of FIG. 6, a target secondary node (target secondary node 605-*c*, 605-*d*, and/or 605-*e*) may provide execution conditions for PSCell change to target PSCells as well as measurement configurations associated with its prepared PSCells.

Based on the information received from the secondary nodes 605 (e.g., the set of secondary nodes or the preferred secondary nodes), at 660, the master node 605-*a* may transmit a control message (e.g., an RRC reconfiguration message) including a CPC configuration, a CPA configuration, or both, to the UE 615. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 605-*a* may provide, for each prepared PSCell, execution conditions for PSCell change/addition to target PSCells.

When the UE 615 receives the configuration (e.g., CPC configuration, CPA configuration) from the master node 605-*a*, the UE 615 may store the full configurations for all prepared PSCells. As such, the stored information included in the configuration may be used to perform a series of CPA procedures, CPC procedures, or the like, which may be based on the SCG configurations, the MCG configurations, the set of execution conditions being satisfied, or a combination thereof. For example, the UE 615 may perform a first conditional PSCell procedure based on a first set of execution conditions to a first target PSCell (e.g., which may be associated with a source secondary node or a target secondary node), followed by a second conditional PSCell procedure to a second target PSCell (e.g., which may be associated with a source secondary node or a target secondary node) based on a second set of execution conditions. The UE 615 may retain the configuration for use with additional PSCell changes or additions. For example, the UE 615 may store the configuration after the first PSCell conditional procedure and perform the second conditional PSCell procedure based on the stored configuration. Similarly, the UE 615 may store the configuration after the second conditional PSCell procedure.

Figure 7:
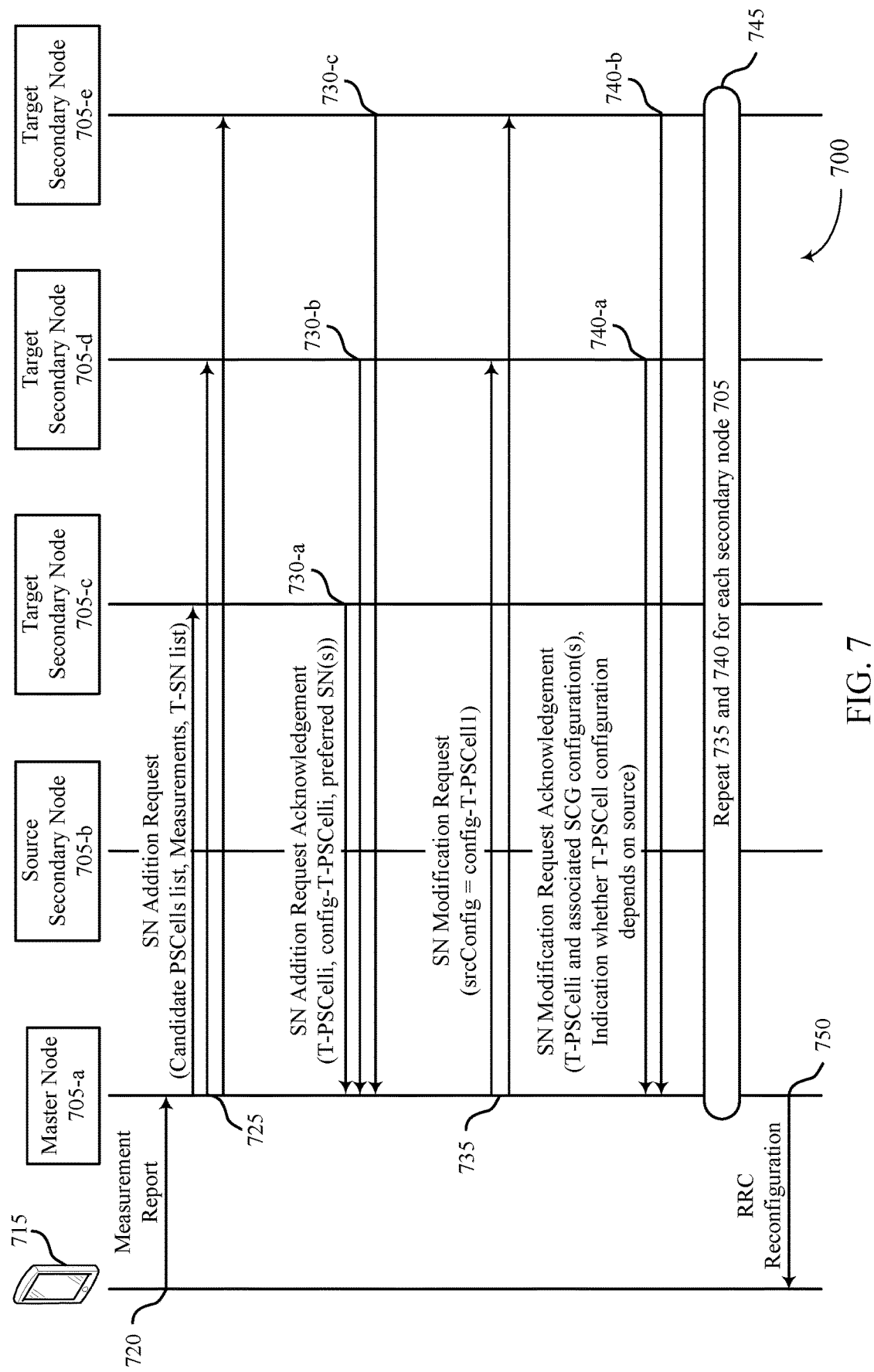

FIG. 7 illustrates an example of a process flow 700 that supports techniques for configuring multiple SCGs in accordance with aspects of the present disclosure. In some examples, the process flow 700 may be related to aspects of the wireless communications system 100 or the wireless communications system 200. For example, the process flow 700 may be implemented by a master node 705-*a*, a secondary node 705-*b* (e.g., a source secondary node), one or more target secondary nodes 705 (e.g., secondary node 705-*c*, secondary node 705-*d*, secondary node 705-*e*), and a UE 715, which may be examples of master nodes, secondary nodes, and a UE as described herein. The UE 715 may have dual connectivity with the master node 705-*a* (e.g., via a PCell, which may be associated with an MCG) and the secondary node 705-*b* (e.g., via a PSCell, which may be associated with a SCG). The process flow 700 may illustrate operations for configuring a single configuration for the UE 715 to perform a series of conditional PSCell changes and/or additions.

The process flow 700 may correspond to a source master node-initiated conditional PSCell procedure (e.g., a CPA or CPC initiated by the master node 705-*a*), which may be referred to as master node-initiated inter-secondary node CPC, master node-initiated inter-secondary node CPA, or some similar terminology. However, it is understood that operations similar to those described in the example of FIG. 7 may apply to CPA procedures and/or CPC procedures initiated by the secondary node 705-*b*.

The master node 705-*a* may initiate the conditional PSCell procedure based on one or more measurements. For instance, at 720, the UE 715 may transmit, to the master node 705-*a*, a measurement report including results of one or more measurements performed by the UE 715. Based on the measurement report, the master node 705-*a* may determine to initiate a conditional PSCell procedure (e.g., CPA, CPC). For example, at 725, the master node 705-*a* may transmit respective first messages (e.g., secondary node addition request messages) to each of the target secondary nodes 705 (e.g., to secondary node 705-*c*, 705-*d*, and/or 705-*e*). Each of the first messages transmitted at 725 may include a list of candidate PSCells, a list of PSCells identifiers, a list of target secondary nodes (e.g., a T-SN list) included in a set of target secondary nodes 705 (e.g., secondary nodes 705-*c*, 705-*d*, and/or 705-*e*), measurements from the measurement report, or a combination thereof. In such cases, the first message transmitted at 725 to each target secondary node 705 may include a respective identifier for each target secondary node 705 included in the set of target secondary nodes 705.

At 730, in response to the first message from the master node 705-*a*, each secondary node 705 may transmit a second message (e.g., a secondary node addition requests acknowledgment) to the master node 705-*a*. For example, at 730-*a*, the secondary node 705-*c* may transmit a first secondary node addition request acknowledgment message to the master node 705-*a*. Similarly, at 730-*b* and 730-*c*, the secondary nodes 705-*d* and 705-*e* may transmit a second and a third addition request acknowledgment message, respectively, to the master node 705-*a*. A secondary node addition request acknowledgment message from a secondary node 705 may include an indication of one or more target PSCells (e.g., T-PSCelli) associated with the secondary node 705 and respective SCG configurations of the one or more target PSCells (e.g., config-T-PSCelli). In some examples, such as those described by the present disclosure, each secondary node 705-*c*, 705-*d*, and/or 705-*e* may include an indication of a subset of secondary nodes (e.g., preferred secondary nodes) based on the list of secondary nodes received from the master node 705-*a*.

As an illustrative example, the secondary node 705-c may indicate, in the second message, that one or both of secondary nodes 705-d or 705-e are preferred secondary nodes 705, which may be based on a location of the respective secondary nodes 705-d or 705-e, a proximity of the respective secondary nodes 705-d or 705-e to secondary node 705-c, one or more other parameters, or any combination thereof. The subset of secondary nodes 705 may be selected from the set of secondary nodes 705 indicated by the master node 705-a. The subset of secondary nodes may be identified for upcoming conditional PSCell procedures by the UE 715. As such, a target secondary node may indicate a preferred set of secondary nodes for PSCell change/addition during a preparation procedure.

At 735, based on the respective second messages (e.g., the secondary node addition request acknowledgment messages) received from the target secondary nodes 705, the master node 705-a may transmit a third message (e.g., a secondary node modification request message) to each of the target secondary nodes 705-d and 705-e. That is, upon receiving information regarding prepared PSCells and preferred secondary nodes 705 from a target secondary node 705, the master node 705-a (e.g., a source master node) may initiate a secondar node modification procedures with the preferred secondary nodes 705 to obtain target PSCell SCG configurations. Thus, the third message may indicate, to a target secondary node (e.g., target secondary node 705-d, target secondary node 705-e), the prepared target PSCells of the subset of target secondary nodes 705 (e.g., the PSCells of the preferred secondary nodes). In addition, the third message (e.g., the secondary node modification request), may include the configurations of prepared PSCells as source configurations. In response the secondary nodes 705 may respond with an indication of whether a SCG configuration of a prepared PSCell is dependent on the source configuration.

For instance, in a third message sent to secondary node 705-d at 735, the master node 705-a may indicate a PSCell configuration (e.g., a SCG configuration) associated with the secondary node 705-c (e.g., config-T-PSCell1) as a source PSCell configuration (e.g., srcConfig=config-T-PSCell1). In response, at 740-a, the secondary node 705-d may transmit a fourth message (e.g., a secondary cell modification request acknowledgment message) to provide one or more target PSCell configurations and further indicate whether the SCG configurations is/are dependent on the source configuration (e.g., config-T-PSCell1) indicated by the master node 705-a. In some examples, if the one or more SCG configurations are not dependent on the source configuration, then the secondary node 705-d may not include (e.g., may omit) the SCG configuration from the fourth message. The secondary node 705-e may similarly transmit a fourth message to the master node 705-a, at 740-b, in response to a received third message.

At 745, the aspects of 735 and 740 may be repeated for each secondary node 705. For instance, the master node 705-a may transmit the third message (e.g., a secondary node modification request message) to each of the target secondary nodes 705-c and 705-e, where the third message may indicate a PSCell configuration (e.g., a SCG configuration) associated with the secondary node 705-d (e.g., config-T-PSCell2) as a source PSCell configuration (e.g., srcConfig=config-T-PSCell2). In response, the secondary nodes 705-c and 705-e may transmit a fourth message (e.g., a secondary cell modification request acknowledgment message) to provide one or more target PSCell configurations and further indicate whether the SCG configurations is/are dependent on the source configuration (e.g., config-T-PSCell1) indicated by the master node 705-a. Similar functions may be repeated for a number of secondary nodes 705 that are included in the set of (preferred) target secondary nodes 705.

Based on the information received from the secondary nodes (e.g., the set of secondary nodes or the preferred secondary nodes), at 750, the master node 705-a may transmit a control message (e.g., an RRC reconfiguration message) including a CPC configuration, a CPA configuration, or both, to the UE 715. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 705-a may provide, for each prepared PSCell, execution conditions for PSCell change/addition to target PSCells.

In some aspects, the master node 705-a may provide, within the configuration signaled at 750, the execution conditions for possible PSCell changes based on the preferred secondary nodes for each target secondary node 705. In the example of FIG. 7, one PSCell (T-PSCelli) may be prepared by each target secondary node 705. Here, config-T-PSCelli may denote an SCG configuration associated with T-PSCelli. For a prepared PSCell, a full SCG configuration may be provided and signaled to the UE 715. Additionally, or alternatively, a delta SCG configuration with respect to a source PSCell configuration may be provided.

Upon receiving the configuration (e.g., CPC configuration, CPA configuration) from the master node 705-a, the UE 715 stores the full configuration for all prepared PSCells. As such, the stored information included in the configuration may be used to perform a series of CPA procedures, CPC procedures, or the like, which may be based on the SCG configurations, the MCG configurations, the set of execution conditions being satisfied, or a combination thereof. For example, the UE 715 may perform a first PSCell conditional procedure based on a first set of execution conditions to a first target PSCell (e.g., which may be associated with a source secondary node or a target secondary node), followed by a second PSCell conditional procedure to a second target PSCell (e.g., which may be associated with a source secondary node or a target secondary node) based on a second set of execution conditions.

Figure 8:
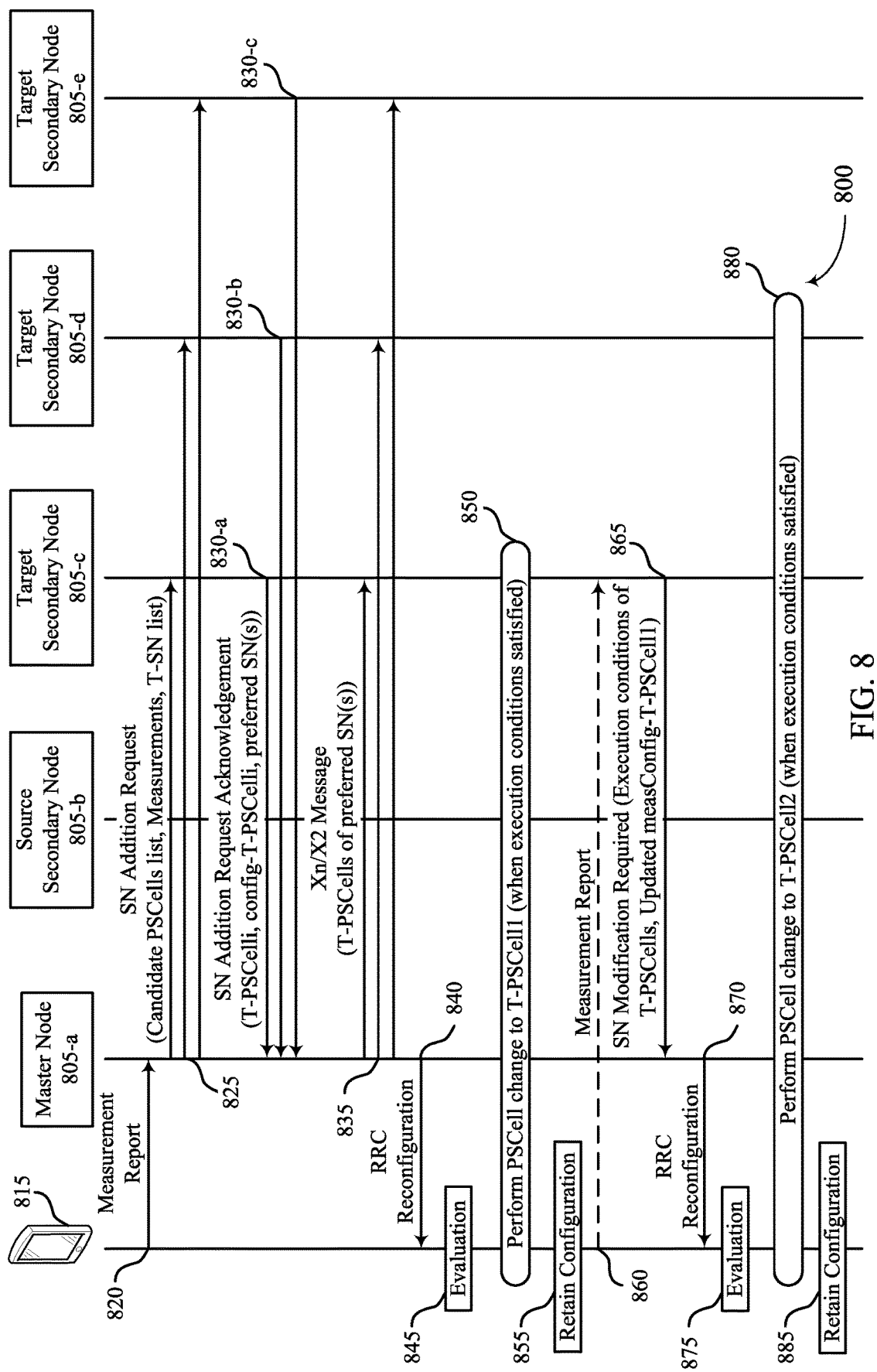

FIG. 8 illustrates an example of a process flow 800 in a system that supports techniques for configuring multiple SCGs in accordance with aspects of the present disclosure. In some examples, the process flow 800 may be related to aspects of the wireless communications system 100 or the wireless communications system 200. For example, the process flow 800 may be implemented by a master node 805-a, a secondary node 805-b (e.g., a source secondary node), one or more target secondary nodes 805 (e.g., secondary node 805-c, secondary node 805-d, secondary node 805-e), and a UE 815, which may be examples of master nodes, secondary nodes, and a UE as described herein. The UE 815 may have dual connectivity with the master node 805-a (e.g., via a PCell, which may be associated with an MCG) and the secondary node 805-b (e.g., via a PSCell, which may be associated with a SCG). The process flow 800 may illustrate operations for configuring a single configuration for the UE 815 to perform a series of conditional PSCell changes and/or additions.

The process flow 800 may correspond to a source master node-initiated conditional PSCell procedure (e.g., a CPA or CPC initiated by the master node 805-*a*), which may be referred to as master node-initiated inter-secondary node CPC, master node-initiated inter-secondary node CPA, or some similar terminology. The master node 805-*a* may initiate the conditional PSCell procedure based on one or more measurements. For instance, at 820, the UE 815 may transmit, to the master node 805-*a*, a measurement report including results of one or more measurements performed by the UE 815.

Based on the measurement report, the master node 805-*a* may determine to initiate a conditional PSCell procedure (e.g., CPA, CPC). For example, at 825, the master node 805-*a* may transmit respective first messages (e.g., secondary node addition request messages) to each of the target secondary nodes 805 (e.g., to secondary node 805-*c*, 805-*d*, and/or 805-*e*). Each of the first messages transmitted at 825 may include a list of candidate PSCells, a list of PSCells identifiers, a list of target secondary nodes (e.g., a T-SN list) included in a set of target secondary nodes 805 (e.g., secondary nodes 805-*c*, 805-*d*, and/or 805-*e*), measurements from the measurement report, or a combination thereof. In such cases, the first message transmitted at 825 to each target secondary node 805 may include a respective identifier for each target secondary node 805 included in the set of target secondary nodes 805.

At 830, in response to the first message from the master node 805-*a*, each secondary node 805 may transmit a second message (e.g., a secondary node addition requests acknowledgment) to the master node 805-*a*. For example, at 830-*a*, the secondary node 805-*c* may transmit a first secondary node addition request acknowledgment message to the master node 805-*a*. Similarly, at 830-*b* and 830-*c*, the secondary nodes 805-*d* and 805-*e* may transmit a second and a third addition request acknowledgment message, respectively, to the master node 805-*a*. A secondary node addition request acknowledgment message from a secondary node 805 may include an indication of one or more prepared target PSCells (e.g., T-PSCelli) associated with the secondary node 805 and respective SCG configurations of the one or more target PSCells (e.g., config-T-PSCelli). In some examples, such as those described by the present disclosure, each secondary node 805-*c*, 805-*d*, and/or 805-*e* may include an indication of a subset of secondary nodes (e.g., preferred secondary nodes) based on the list of secondary nodes received from the master node 805-*a*.

For instance, the secondary node 805-*c* may indicate, in the second message, that one or both of secondary nodes 805-*d* or 805-*e* are preferred secondary nodes 805, which may be based on a location of the respective secondary nodes 805-*d* or 805-*e*, a proximity of the respective secondary nodes 805-*d* or 805-*e* to secondary node 805-*c*, one or more other parameters, or any combination thereof. The subset of secondary nodes 805 may be selected from the set of secondary nodes 805 indicated by the master node 805-*a*. The subset of secondary nodes may be identified for upcoming conditional PSCell procedures by the UE 815. As such, a target secondary node may indicate a preferred set of secondary nodes for PSCell change/addition during a preparation procedure.

At 835, based on the respective second messages (e.g., the secondary node addition request acknowledgment messages) received from the target secondary nodes 805, the master node 805-*a* may transmit a third message (e.g., an Xn/X2 message) to each of the target secondary nodes 805-*c*, 805-*d*, and 805-*e*. The third message may indicate, to a target secondary node, the prepared target PSCells of the subset of target secondary nodes 805 (e.g., the PSCells of the preferred secondary nodes).

Based on the information received from the secondary nodes (e.g., the set of secondary nodes or the preferred secondary nodes), at 840, the master node 805-*a* may transmit a control message (e.g., an RRC reconfiguration message) including a CPC configuration, a CPA configuration, or both, to the UE 815. In some examples, the RRC configuration may include a set of prepared PSCells for a CPC procedure, a CPA procedure, or the like. For each prepared PSCell, the configuration may further include a set of target PSCells for PSCell change or addition, execution conditions for PSCell change to or addition of a target PSCell, SCG configurations and MCG configurations. That is, in an RRC reconfiguration message transmitted to the UE, the master node 805-*a* may provide, for each prepared PSCell, execution conditions for PSCell change/addition to target PSCells.

In some examples, because a first target secondary node 805 may determine the execution conditions when a source PSCell is a cell of the first secondary node, the CPA/CPC configuration included in the RRC reconfiguration message may include the execution conditions for only the initial conditional PSCell addition/change procedure. For a subsequent conditional PSCell addition or change, the secondary node 805 the UE 815 is connected to may provide the execution conditions.

As an illustrative example, the UE 815 may receive the single configuration for performing the series of conditional PSCell procedures (e.g., changes or additions) via the control message received at 840. The UE 815 may store the full configuration (e.g., the configuration including two or more SCG configurations, which may be referred to as a multi-SCG configuration) for use at a later time. For example, the UE 815 may retain the full configuration after each subsequent PSCell change or addition. At 845, the UE 815 may evaluate whether execution conditions are satisfied to perform a first conditional PSCell procedure of the series of conditional PSCell procedure.

At 850, when the execution conditions are satisfied, the UE 815 may establish a connection with a target PSCell associated with a first target secondary node 805 (e.g., PSCell1 associated with secondary node 805-*c*). That is, the UE 815 may perform a PSCell change from a PSCell associated with secondary node 805-*b* to the target PSCell of the secondary node 805-*c*. At 855, the UE 815 may retain (e.g., store, save) the configuration for performing the series of conditional PSCell procedures for subsequent conditional PSCell changes, conditional PSCell additions, or both.

At 860, the UE 815 may optionally transmit one or more measurement reports to the secondary node 805-*c*. For example, the UE 815 may perform one or more measurements and report the measurements results to the secondary node 805-*c* (e.g., the current serving secondary node).

At 865, the secondary node 805-*c* may transmit a message (e.g., a secondary node modification request message) to the master node 805-*a*. In some examples, the message transmitted at 865 may be transmitted based on the measurements received from the UE 815. The secondary node modification request message may include execution conditions for target PSCells of the subset of secondary nodes 805 (e.g., the execution conditions for target PSCells of the preferred secondary nodes). In addition, the secondary node modification request message may include a measurement configuration (e.g., an updated measurement configuration, measConfig-T-PSCell1) for the PSCell of the secondary node 805-*c* (e.g., PSCell1). In some aspects, a source master node (e.g., the master node 805-*a*) may also provide the execution conditions for subsequent conditional PSCell additions or changes.

At 870, the master node 805-*a* may transmit a second control message (e.g., an RRC reconfiguration message) to the UE 815 that includes an indication of the execution conditions for target PSCells of the preferred secondary nodes, the updated measurement configuration, or both. In such cases, the UE 815 may store the additional information received from the master node 805-*a* for use with subsequent conditional PSCell additions or changes. For example, at 875, the UE 815 may evaluate whether the additional execution conditions (e.g., signaled at 870) are satisfied to perform a second conditional PSCell procedure of the series of conditional PSCell procedure.

At 880, when the execution conditions are satisfied, the UE 815 may establish a connection with a target PSCell associated with a second target secondary node 805 (e.g., PSCell2 associated with secondary node 805-*d*). That is, the UE 815 may perform a PSCell change from a PSCell associated with secondary node 805-*c* to the target PSCell of the secondary node 805-*d*. At 885, the UE 815 may retain (e.g., store, save) the configuration for performing the series of conditional PSCell procedures for subsequent conditional PSCell changes, conditional PSCell additions, or both.

Figure 9:
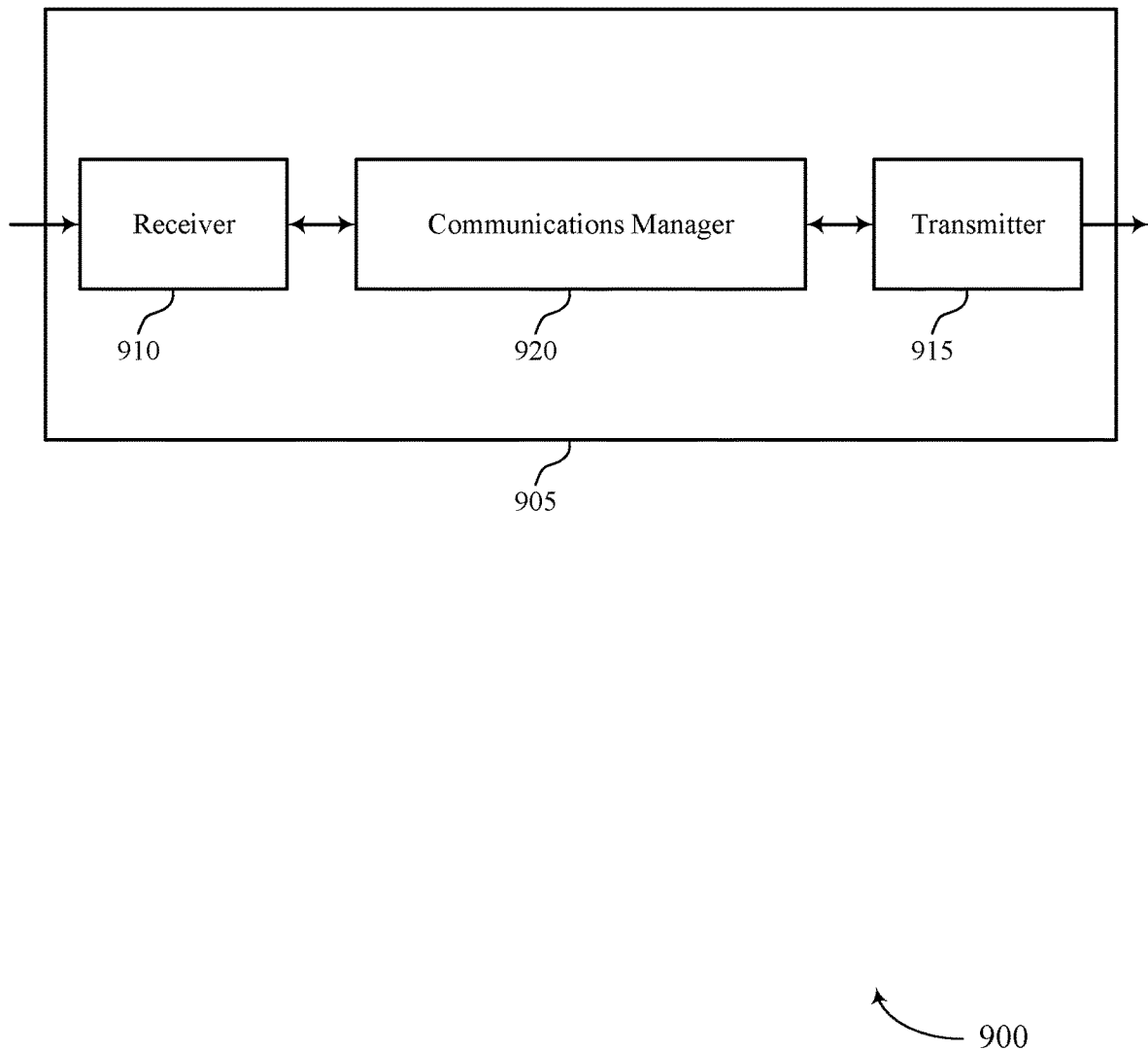
FIGS. 9 and 10 show block diagrams of devices that support techniques for configuring multiple SCGs in accordance with aspects of the present disclosure.

FIG. 9 shows a block diagram 900 of a device 905 that supports techniques for configuring multiple SCGs in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multi-SCG configurations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multi-SCG configurations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of multi-SCG configurations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910. The communications manager 920 may send information to the transmitter 915. The communications manager 920 may be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving, from a master node associated with a primary cell, a first control message including an indication of a configuration for performing a series of conditional procedures for establishing respective connections with two or more PSCells associated with a set of multiple target secondary nodes. In some examples, the configuration includes an indication that the configuration is applicable to the series of conditional procedures. The communications manager 920 may be configured as or otherwise support a means for establishing a first connection with a first target PSCell of the two or more PSCells based on the configuration and a first set of execution conditions being satisfied, where the first target PSCell is associated with a first secondary node. The communications manager 920 may be configured as or otherwise support a means for establishing a second connection with a second target PSCell of the two or more PSCells based on the configuration and a second set of execution conditions being satisfied. In some examples, the second target PSCell may be associated with a second secondary node different from the first secondary node. In other examples, the second target PSCell may be associated with the first secondary node.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources by utilizing multi-SCG configurations for conditional procedures.

Figure 10:
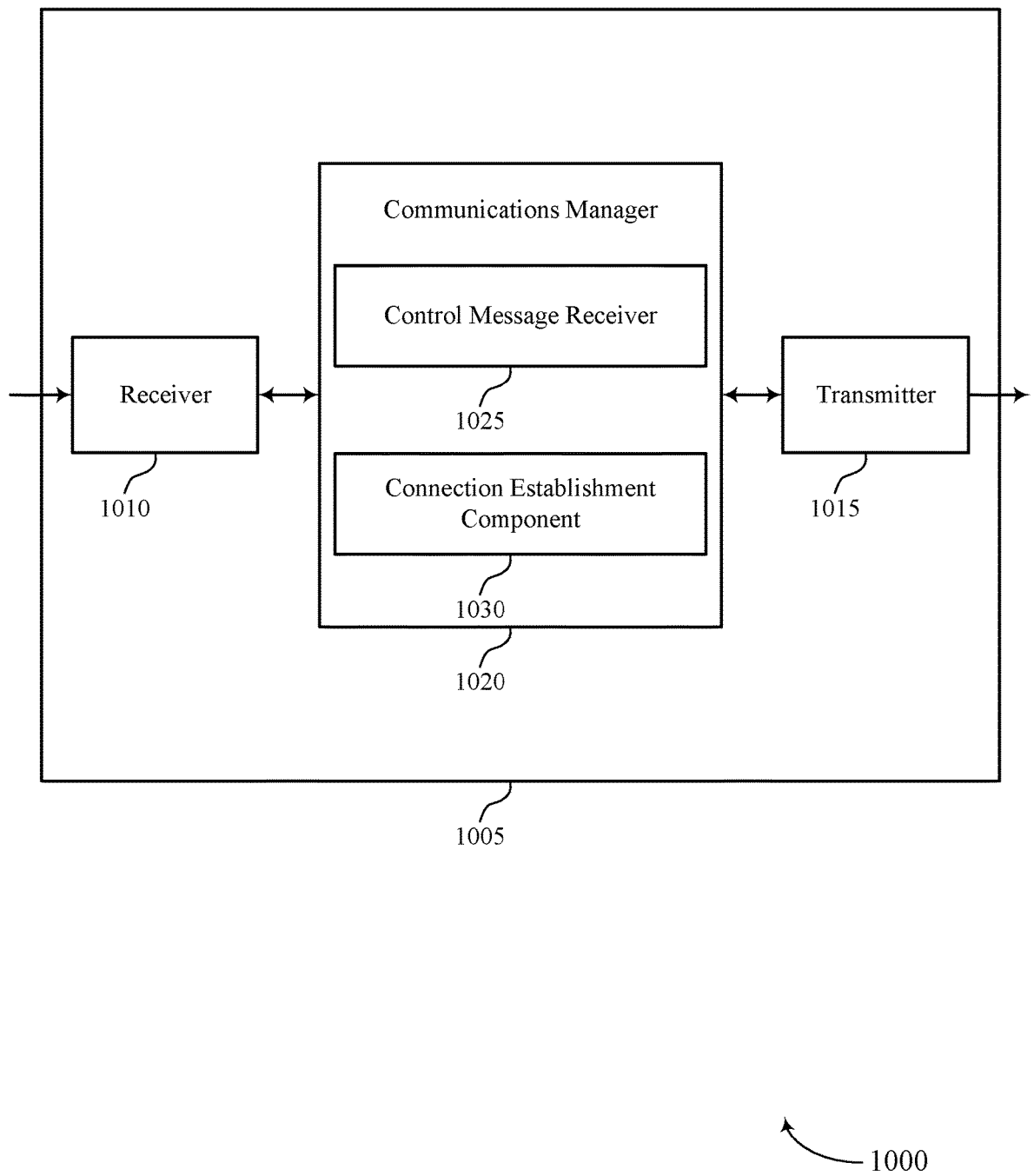

FIG. 10 shows a block diagram 1000 of a device 1005 that supports techniques for configuring multiple SCGs in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to multi-SCG configurations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to multi-SCG configurations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of multi-SCG configurations as described herein. For example, the communications manager 1020 may include a control message receiver 1025 a connection establishment component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010. The communications manager 1020 may send information to the transmitter 1015. The communications manager 1020 may be integrated in combination with the receiver 1010, the transmitter 1015, or both to receive information, transmit information, or perform various other operations as described herein.

The communications manager 1020 may support wireless communications at a UE in accordance with examples as disclosed herein. The control message receiver 1025 may be configured as or otherwise support a means for receiving, from a master node associated with a primary cell, a first control message including an indication of a configuration for performing a series of conditional procedures for establishing respective connections with two or more PSCells associated with a set of multiple target secondary nodes. in some cases, the configuration may include an indication that the configuration is applicable to the series of conditional procedures. The connection establishment component 1030 may be configured as or otherwise support a means for establishing a first connection with a first target PSCell of the two or more PSCells based on the configuration and a first set of execution conditions being satisfied, where the first target PSCell is associated with a first secondary node. The connection establishment component 1030 may be configured as or otherwise support a means for establishing a second connection with a second target PSCell of the two or more PSCells based on the configuration and a second set of execution conditions being satisfied, where the second target PSCell is associated with a second secondary node. In some examples, the second secondary node may be the same as the first secondary node. In other examples, the second secondary node may be different from the first secondary node.

Figure 11:
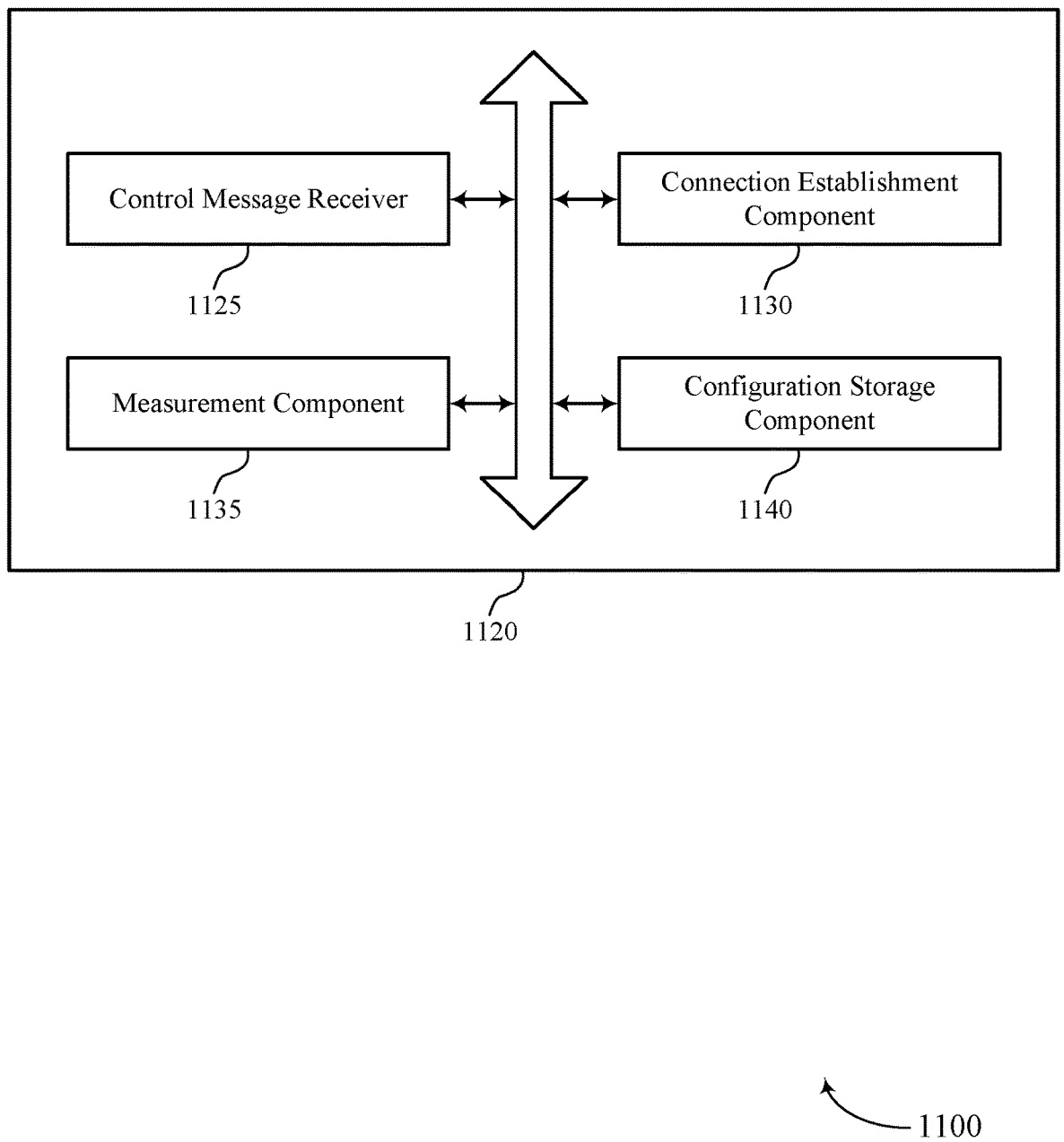
FIG. 11 shows a block diagram of a communications manager that supports techniques for configuring multiple SCGs in accordance with aspects of the present disclosure.

FIG. 11 shows a block diagram 1100 of a communications manager 1120 that supports techniques for configuring multiple SCGs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring multiple SCGs as described herein. For example, the communications manager 1120 may include a control message receiver 1125, a connection establishment component 1130, a measurement component 1135, a configuration storage component 1140, or any combination thereof. Each of these components may communicate, directly or indirectly, with one another (e.g., via one or more buses).

The communications manager 1120 may support wireless communications at a UE in accordance with examples as disclosed herein. The control message receiver 1125 may be configured as or otherwise support a means for receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures. The connection establishment component 1130 may be configured as or otherwise support a means for establishing a first connection with a first target PSCell of the two or more PSCells based on the configuration and a first set of execution conditions being satisfied, where the first target PSCell is associated with a first secondary node. In some examples, the connection establishment component 1130 may be configured as or otherwise support a means for establishing a second connection with a second target PSCell of the two or more PSCells based on the configuration and a second set of execution conditions being satisfied, where the second target PSCell is associated with the first secondary node or a second secondary node.

In some examples, the control message receiver 1125 may be configured as or otherwise support a means for receiving, from the second secondary node, a second control message indicating the second set of execution conditions for the second target PSCell, where the second control message is received after the first control message.

In some examples, the second control message indicates a first measurement configuration for the first target PSCell that is modified with respect to a previous measurement configuration for the first target PSCell, and the measurement component 1135 may be configured as or otherwise support a means for performing one or more measurements based on the first measurement configuration for the first target PSCell.

In some examples, the configuration includes an indication of the set of multiple target secondary nodes, one or more target PSCells of each secondary node of the set of multiple target secondary nodes, a set of execution conditions for an addition of or change to the one or more target PSCells, respective SCG configurations associated with each PSCell of the one or more target PSCells, one or more MCG configurations, or any combination thereof.

In some examples, the configuration storage component 1140 may be configured as or otherwise support a means for storing the set of execution conditions, the respective SCG configurations associated with each PSCell of the one or more target PSCells, the one or more MCG configurations, or any combination thereof, based on the indication that the configuration is applicable to the series of conditional procedures, where the series of conditional procedures is based on storing the set of execution conditions, the respective SCG configurations associated with each PSCell of the one or more target PSCells, the one or more MCG configurations, or any combination thereof.

In some examples, the configuration includes respective PSCell configurations of a set of multiple prepared PSCells, each PSCell configuration of the respective PSCell configurations being relative to another PSCell configuration of the respective PSCell configurations, or relative to a source PSCell configuration, or any combination thereof. In some examples, the series of conditional procedures includes a conditional PSCell change, a conditional PSCell addition, or both.

Figure 12:
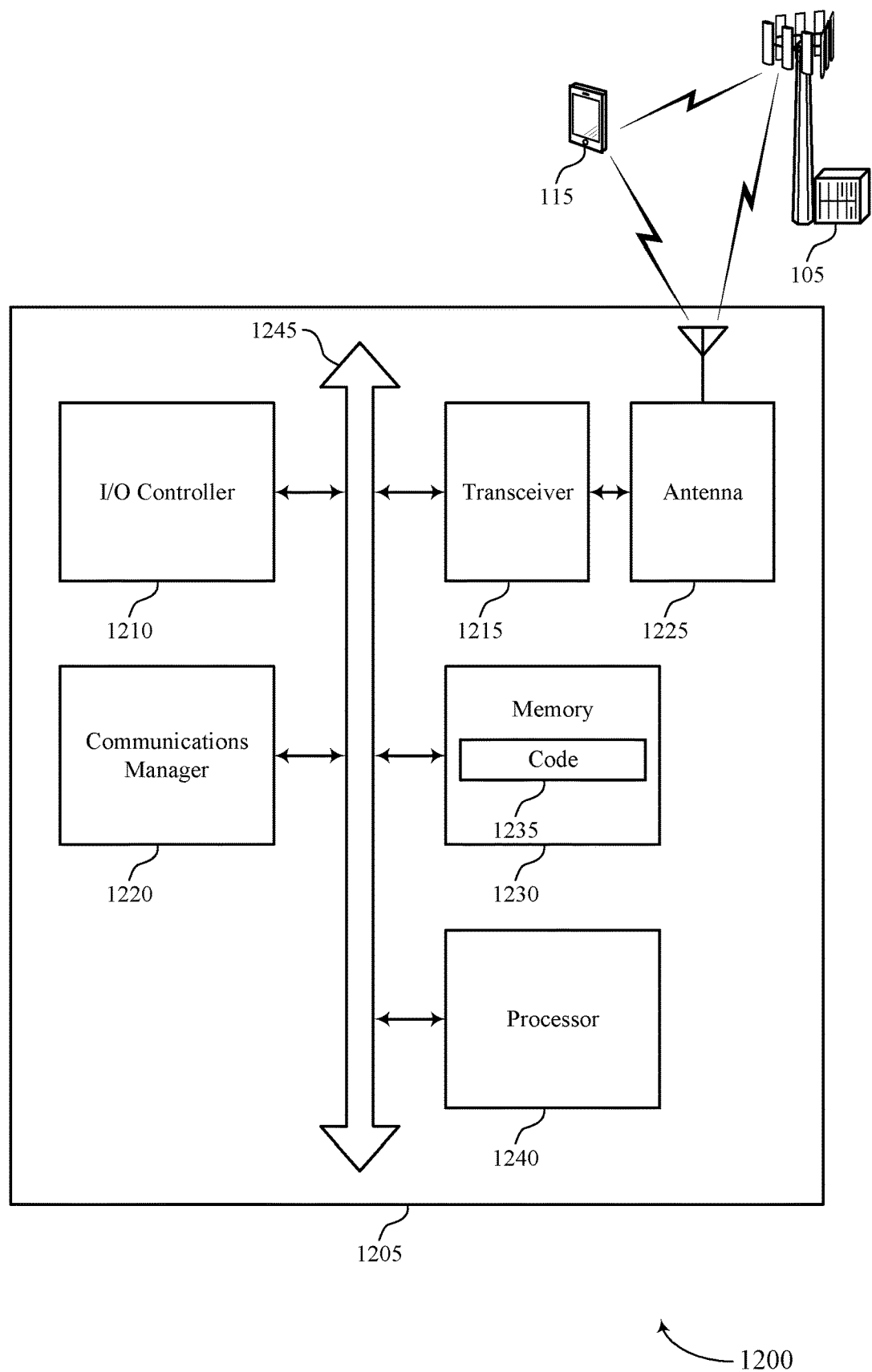
FIG. 12 shows a diagram of a system including a device that supports multi-techniques for configuring multiple SCGs in accordance with aspects of the present disclosure.

FIG. 12 shows a diagram of a system 1200 including a device 1205 that supports techniques for configuring multiple SCGs in accordance with aspects of the present disclosure. The device 1205 may be an example of or include the components of a device 905, a device 1005, or a UE 115 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring multiple SCGs). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures. The communications manager 1220 may be configured as or otherwise support a means for establishing a first connection with a first target PSCell of the two or more PSCells based on the configuration and a first set of execution conditions being satisfied, where the first target PSCell is associated with a first secondary node. The communications manager 1220 may be configured as or otherwise support a means for establishing a second connection with a second target PSCell of the two or more PSCells based on the configuration and a second set of execution conditions being satisfied, where the second target PSCell is associated with the first secondary node or a second secondary node.

By including or configuring the communications manager 1220 in accordance with examples as described herein, the device 1205 may support techniques for reduced signaling overhead, decreased power consumption, and reduced latency by utilizing multi-SCG configurations for conditional procedures (e.g., conditional PSCell changes and/or additions).

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring multiple SCGs as described herein, or the processor 1240 and the memory 1230 may be otherwise configured to perform or support such operations.

Figure 13:
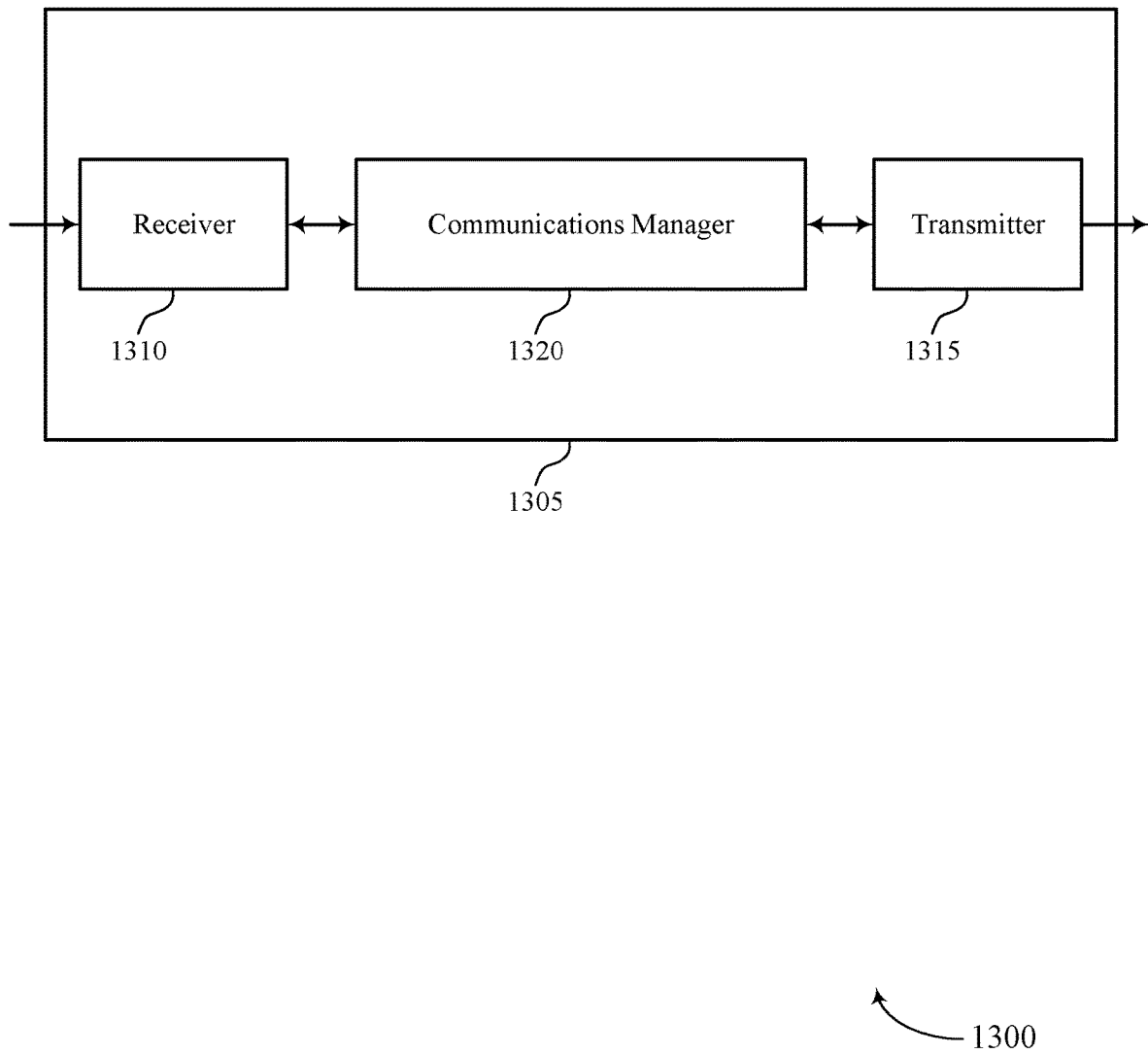
FIGS. 13 and 14 show block diagrams of devices that support techniques for configuring multiple SCGs in accordance with aspects of the present disclosure.

FIG. 13 shows a block diagram 1300 of a device 1305 that supports techniques for configuring multiple SCGs in accordance with aspects of the present disclosure. The device 1305 may be an example of aspects of a network entity as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for configuring multiple SCGs). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for configuring multiple SCGs). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for configuring multiple SCGs as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a secondary node in accordance with examples as disclosed herein. For example, the communications manager 1320 may be configured as or otherwise support a means for receiving, from a master node associated with a primary cell, a first message indicating respective identifiers for a set of multiple target secondary nodes including the secondary node, a set of measurement results for the secondary node, and one or more candidate PSCells associated with the secondary node. The communications manager 1320 may be configured as or otherwise support a means for transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

Additionally, or alternatively, the communications manager 1320 may support wireless communications at a master node in accordance with examples as disclosed herein. For example, the communications manager 1320 may be configured as or otherwise support a means for transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes. The communications manager 1320 may be configured as or otherwise support a means for receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

Additionally, or alternatively, the communications manager 1320 may support wireless communications at a first secondary node in accordance with examples as disclosed herein. For example, the communications manager 1320 may be configured as or otherwise support a means for receiving a measurement report from a UE. The communications manager 1320 may be configured as or otherwise support a means for determining to initiate a procedure for changes or additions to PSCells at a secondary node of the UE based on the measurement report. The communications manager 1320 may be configured as or otherwise support a means for transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced processing, reduced power consumption, more efficient utilization of communication resources by utilizing multi-SCG configurations for conditional procedures.

Figure 14:
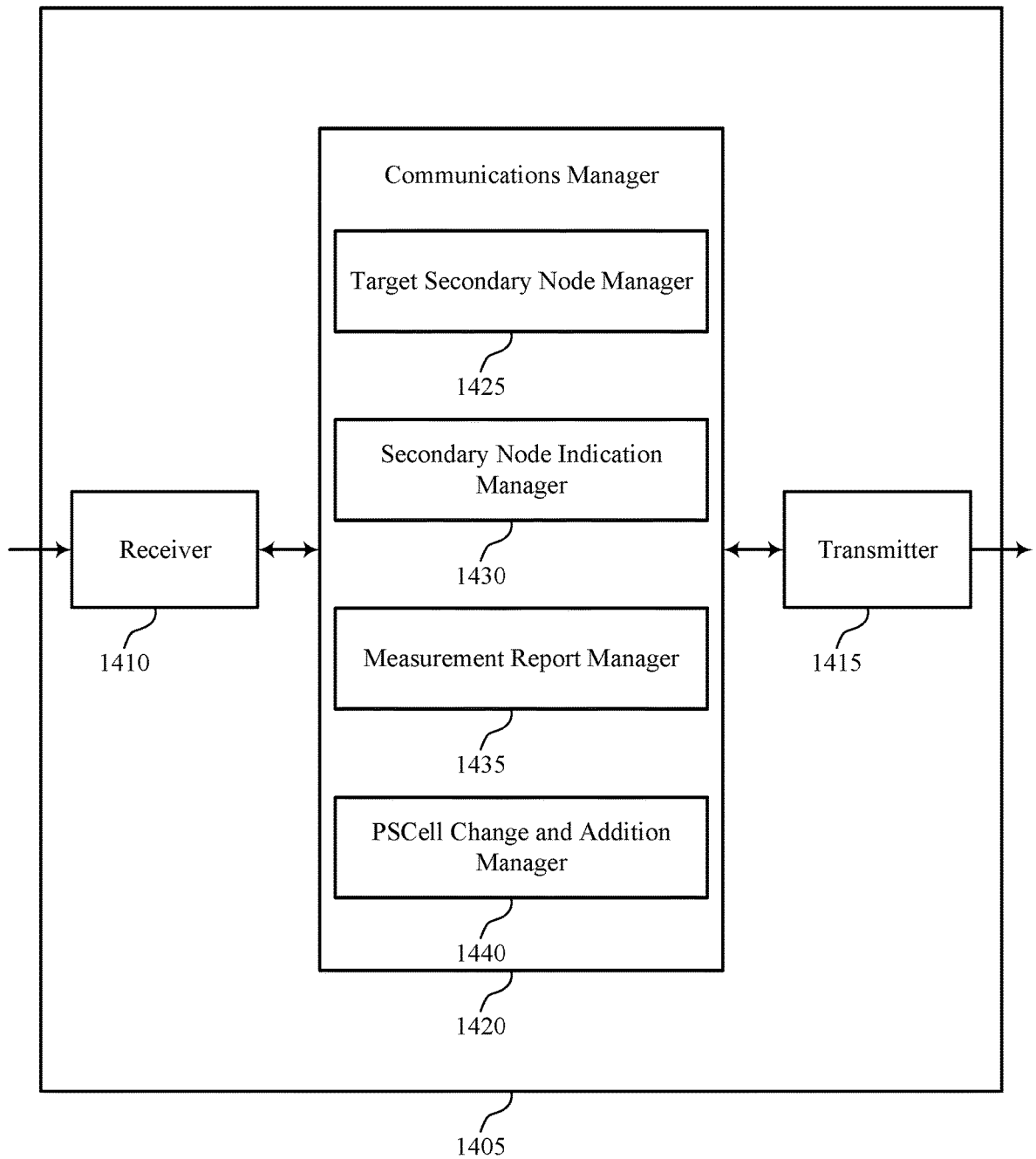

FIG. 14 shows a block diagram 1400 of a device 1405 that supports techniques for configuring multiple SCGs in accordance with aspects of the present disclosure. The device 1405 may be an example of aspects of a device 1305 or a network entity as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for configuring multiple SCGs). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for configuring multiple SCGs). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for configuring multiple SCGs as described herein. For example, the communications manager 1420 may include a target secondary node manager 1425, a secondary node indication manager 1430, a measurement report manager 1435, a PSCell change and addition manager 1440, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a secondary node in accordance with examples as disclosed herein. The target secondary node manager 1425 may be configured as or otherwise support a means for receiving, from a master node associated with a primary cell, a first message indicating respective identifiers for a set of multiple target secondary nodes including the secondary node, a set of measurement results for the secondary node, and one or more candidate PSCells associated with the secondary node. The secondary node indication manager 1430 may be configured as or otherwise support a means for transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

Additionally, or alternatively, the communications manager 1420 may support wireless communications at a master node in accordance with examples as disclosed herein. The target secondary node manager 1425 may be configured as or otherwise support a means for transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes. The secondary node indication manager 1430 may be configured as or otherwise support a means for receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the set of multiple target secondary nodes.

Additionally, or alternatively, the communications manager 1420 may support wireless communications at a first secondary node in accordance with examples as disclosed herein. The measurement report manager 1435 may be configured as or otherwise support a means for receiving a measurement report from a UE. The PSCell change and addition manager 1440 may be configured as or otherwise support a means for determining to initiate a procedure for changes or additions to PSCells at a secondary node of the UE based on the measurement report. The target secondary node manager 1425 may be configured as or otherwise support a means for transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

Figure 15:
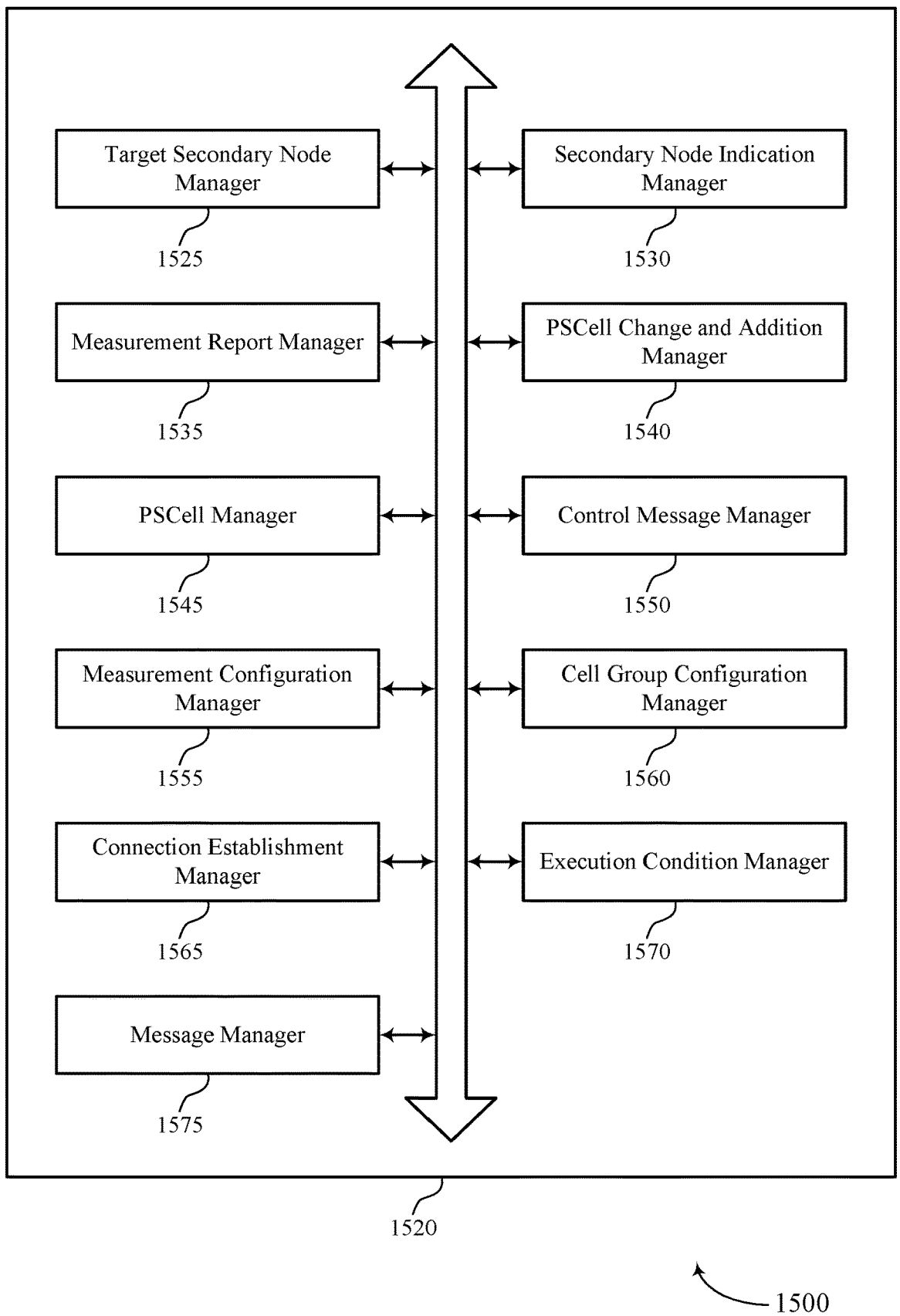
FIG. 15 shows a block diagram of a communications manager that supports techniques for configuring multiple SCGs in accordance with aspects of the present disclosure.

FIG. 15 shows a block diagram 1500 of a communications manager 1520 that supports techniques for configuring multiple SCGs in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of techniques for configuring multiple SCGs as described herein. For example, the communications manager 1520 may include a target secondary node manager 1525, a secondary node indication manager 1530, a measurement report manager 1535, a PSCell change and addition manager 1540, a PSCell manager 1545, a control message manager 1550, a measurement configuration manager 1555, a cell group configuration manager 1560, a connection establishment manager 1565, an execution condition manager 1570, a message manager 1575, or any combination thereof. Each of these components may communicate, directly or indirectly, with one another (e.g., via one or more buses).

The communications manager 1520 may support wireless communications at a secondary node in accordance with examples as disclosed herein. The target secondary node manager 1525 may be configured as or otherwise support a means for receiving, from a master node associated with a primary cell, a first message indicating respective identifiers for a set of multiple target secondary nodes including the secondary node, a set of measurement results for the secondary node, and one or more candidate PSCells associated with the secondary node. The secondary node indication manager 1530 may be configured as or otherwise support a means for transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

In some examples, the secondary node indication manager 1530 may be configured as or otherwise support a means for transmitting, within the second message, an indication of one or more prepared PSCells associated with the secondary node and a respective SCG configuration for each prepared PSCell of the one or more prepared PSCells. In some examples, the PSCell manager 1545 may be configured as or otherwise support a means for receiving, from the master node, a third message indicating a set of prepared target PSCells associated with the subset of secondary nodes, the set of prepared target PSCells including the one or more prepared PSCells associated with one of the subset of secondary nodes, where the series of conditional procedures is based on the set of prepared target PSCells.

In some examples, the measurement configuration manager 1555 may be configured as or otherwise support a means for transmitting, to the master node, a fourth message indicating respective measurement configurations for the one or more prepared PSCells associated with the secondary node in response to the third message, where the respective measurement configurations are based on the set of prepared target PSCells associated with one of the subset of the secondary node.

In some examples, the execution condition manager 1570 may be configured as or otherwise support a means for determining a set of execution conditions associated with each PSCell of the set of prepared target PSCells associated with the subset of secondary nodes. In some examples, the execution condition manager 1570 may be configured as or otherwise support a means for transmitting, within the fourth message, an indication of the set of execution conditions, where the series of conditional procedures are based on the set of execution conditions.

In some examples, the third message includes one or more measurement results associated with the set of prepared target PSCells. In some examples, the set of execution conditions are based on the one or more measurement results.

In some examples, the PSCell manager 1545 may be configured as or otherwise support a means for receiving, within the third message, an indication of respective PSCell configurations associated with one or more target PSCells of the set of prepared target PSCells, where the respective PSCell configurations are indicated as source PSCell configurations. In some examples, the cell group configuration manager 1560 may be configured as or otherwise support a means for transmitting, to the master node, a fourth message indicating a SCG configuration for a first target PSCell associated with the secondary node and an indication of whether the SCG configuration is dependent on a source PSCell configuration.

In some examples, the connection establishment manager 1565 may be configured as or otherwise support a means for establishing, during a first conditional procedure of the series of conditional procedures, a connection between the UE and a first PSCell associated with the secondary node based on a first set of execution conditions being satisfied. In some examples, the execution condition manager 1570 may be configured as or otherwise support a means for determining a set of execution conditions associated with each PSCell of the set of prepared target PSCells for subsequent conditional procedures of the series of conditional procedures. In some examples, the execution condition manager 1570 may be configured as or otherwise support a means for transmitting, to the master node, a fifth message indicating the set of execution conditions and a modified measurement configuration for the first PSCell.

In some examples, the measurement report manager 1535 may be configured as or otherwise support a means for receiving, from the UE, a measurement report including measurement results, where the set of execution conditions are based on the measurement results.

Additionally, or alternatively, the communications manager 1520 may support wireless communications at a master node in accordance with examples as disclosed herein. In some examples, the target secondary node manager 1525 may be configured as or otherwise support a means for transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes. In some examples, the secondary node indication manager 1530 may be configured as or otherwise support a means for receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

In some examples, the PSCell manager 1545 may be configured as or otherwise support a means for receiving, within the respective second messages from the two or more secondary nodes, an indication of one or more prepared PSCells associated with each secondary node and a respective SCG configuration for each prepared PSCell of the one or more prepared PSCells. In some examples, the PSCell manager 1545 may be configured as or otherwise support a means for transmitting, to each secondary node of the two or more secondary nodes or each secondary node of the subset of secondary nodes, respective third messages each indicating a set of prepared target PSCells associated with the subset of secondary nodes, where the series of conditional procedures is based on the set of prepared target PSCells.

In some examples, the measurement configuration manager 1555 may be configured as or otherwise support a means for receiving, from each secondary node of the two or more secondary nodes, respective fourth messages each indicating measurement configurations for one or more PSCells associated with each secondary node in response to a third message of the respective third messages, where the measurement configurations are based on the set of prepared target PSCells.

In some examples, the execution condition manager 1570 may be configured as or otherwise support a means for receiving, within the respective fourth messages, an indication of a set of execution conditions, where the series of conditional procedures are based on the set of execution conditions.

In some examples, the respective third messages each include one or more measurement results associated with the set of prepared target PSCells. In some examples, the set of execution conditions are based on the one or more measurement results.

In some examples, the PSCell manager 1545 may be configured as or otherwise support a means for transmitting, within the respective third messages, an indication of respective PSCell configurations associated with one or more target PSCells of the set of prepared target PSCells, where the respective PSCell configurations are indicated as source PSCell configurations. In some examples, the cell group configuration manager 1560 may be configured as or otherwise support a means for receiving, from a first secondary node of the subset of secondary nodes, a fourth message indicating a SCG configuration for a first target PSCell associated with the first secondary node and an indication of whether the SCG configuration is dependent on a source PSCell configuration.

In some examples, the control message manager 1550 may be configured as or otherwise support a means for transmitting, to the UE, a first control message indicating a configuration for the series of conditional procedures for establishing respective connections with PSCells associated with the set of multiple target secondary nodes, and a second indication that the configuration is applicable to the series of conditional procedures.

In some examples, the configuration includes an indication of the subset of secondary nodes, one or more target PSCells of each secondary node of the subset of secondary nodes, a set of execution conditions for an addition of or change to the one or more target PSCells, respective SCG configurations associated with each PSCell of the one or more target PSCells, one or more MCG configurations, or any combination thereof.

In some examples, the message manager 1575 may be configured as or otherwise support a means for receiving, from at least a first secondary node of the two or more secondary nodes, a fifth message indicating the set of execution conditions and modified measurement configurations for one or more PSCells associated with the first secondary node.

In some examples, the execution condition manager 1570 may be configured as or otherwise support a means for determining the set of execution conditions based on the subset of secondary nodes.

In some examples, the configuration includes respective PSCell configurations of a set of multiple prepared PSCells, each PSCell configuration of the respective PSCell configurations being relative to another PSCell configuration of the respective PSCell configurations, or relative to a source PSCell configuration, or any combination thereof.

In some examples, the control message manager 1550 may be configured as or otherwise support a means for transmitting, to the UE, a second control message indicating additional execution conditions for a conditional procedure of the series of conditional procedures, the conditional procedure being subsequent to an initial conditional procedure of the series of conditional procedures, where the additional execution conditions are based on a measurement report from the UE.

In some examples, the measurement report manager 1535 may be configured as or otherwise support a means for receiving a measurement report from the UE. In some examples, the PSCell change and addition manager 1540 may be configured as or otherwise support a means for determining to initiate a procedure for changes or additions of PSCells at a secondary node of the UE based on the measurement report, where the first message is transmitted based on modifying the secondary node of the UE.

Additionally, or alternatively, the communications manager 1520 may support wireless communications at a first secondary node in accordance with examples as disclosed herein. The measurement report manager 1535 may be configured as or otherwise support a means for receiving a measurement report from a UE. The PSCell change and addition manager 1540 may be configured as or otherwise support a means for determining to initiate a procedure for changes or additions to PSCells at a secondary node of the UE based on the measurement report. In some examples, the target secondary node manager 1525 may be configured as or otherwise support a means for transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

In some examples, the PSCell manager 1545 may be configured as or otherwise support a means for receiving, from the master node, a second message indicating one or more prepared PSCells associated a subset of secondary nodes selected from the set of multiple target secondary nodes. In some examples, the measurement configuration manager 1555 may be configured as or otherwise support a means for determining a modified measurement configuration associated with the first secondary node. In some examples, the measurement configuration manager 1555 may be configured as or otherwise support a means for transmitting, to the master node, a third message indicating the modified measurement configuration.

Figure 16:
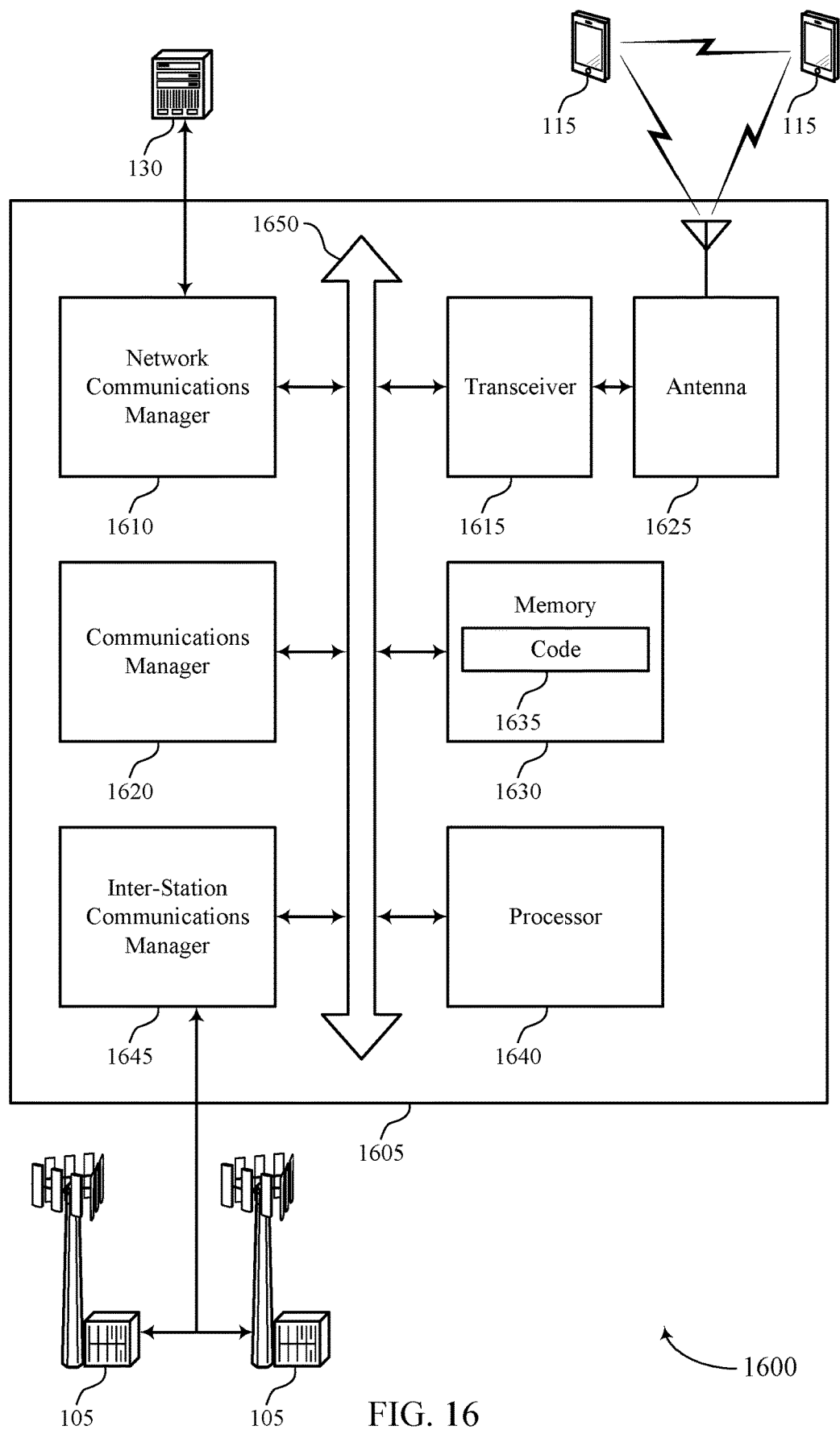
FIG. 16 shows a diagram of a system including a device that supports techniques for configuring multiple SCGs in accordance with aspects of the present disclosure.

FIG. 16 shows a diagram of a system 1600 including a device 1605 that supports techniques for configuring multiple SCGs in accordance with aspects of the present disclosure. The device 1605 may be an example of or include the components of a device 1305, a device 1405, or a network entity as described herein. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory.

In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for configuring multiple SCGs). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other network entities 105, and may include a controller or scheduler for controlling communications with UEs 115 in cooperation with other network entities 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between network entities 105.

The communications manager 1620 may support wireless communications at a secondary node in accordance with examples as disclosed herein. For example, the communications manager 1620 may be configured as or otherwise support a means for receiving, from a master node associated with a primary cell, a first message indicating respective identifiers for a set of multiple target secondary nodes including the secondary node, a set of measurement results for the secondary node, and one or more candidate PSCells associated with the secondary node. The communications manager 1620 may be configured as or otherwise support a means for transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes.

Additionally, or alternatively, the communications manager 1620 may support wireless communications at a master node in accordance with examples as disclosed herein. For example, the communications manager 1620 may be configured as or otherwise support a means for transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes. The communications manager 1620 may be configured as or otherwise support a means for receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes.

Additionally, or alternatively, the communications manager 1620 may support wireless communications at a first secondary node in accordance with examples as disclosed herein. For example, the communications manager 1620 may be configured as or otherwise support a means for receiving a measurement report from a UE. The communications manager 1620 may be configured as or otherwise support a means for determining to initiate a procedure for changes or additions to PSCells at a secondary node of the UE based on the measurement report. The communications manager 1620 may be configured as or otherwise support a means for transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes.

By including or configuring the communications manager 1620 in accordance with examples as described herein, the device 1605 may support techniques for reduced signaling overhead, decreased power consumption, and reduced latency by utilizing multi-SCG configurations for conditional procedures (e.g., CPA, CPC, conditional handover).

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for configuring multiple SCGs as described herein, or the processor 1640 and the memory 1630 may be otherwise configured to perform or support such operations.

Figure 17:
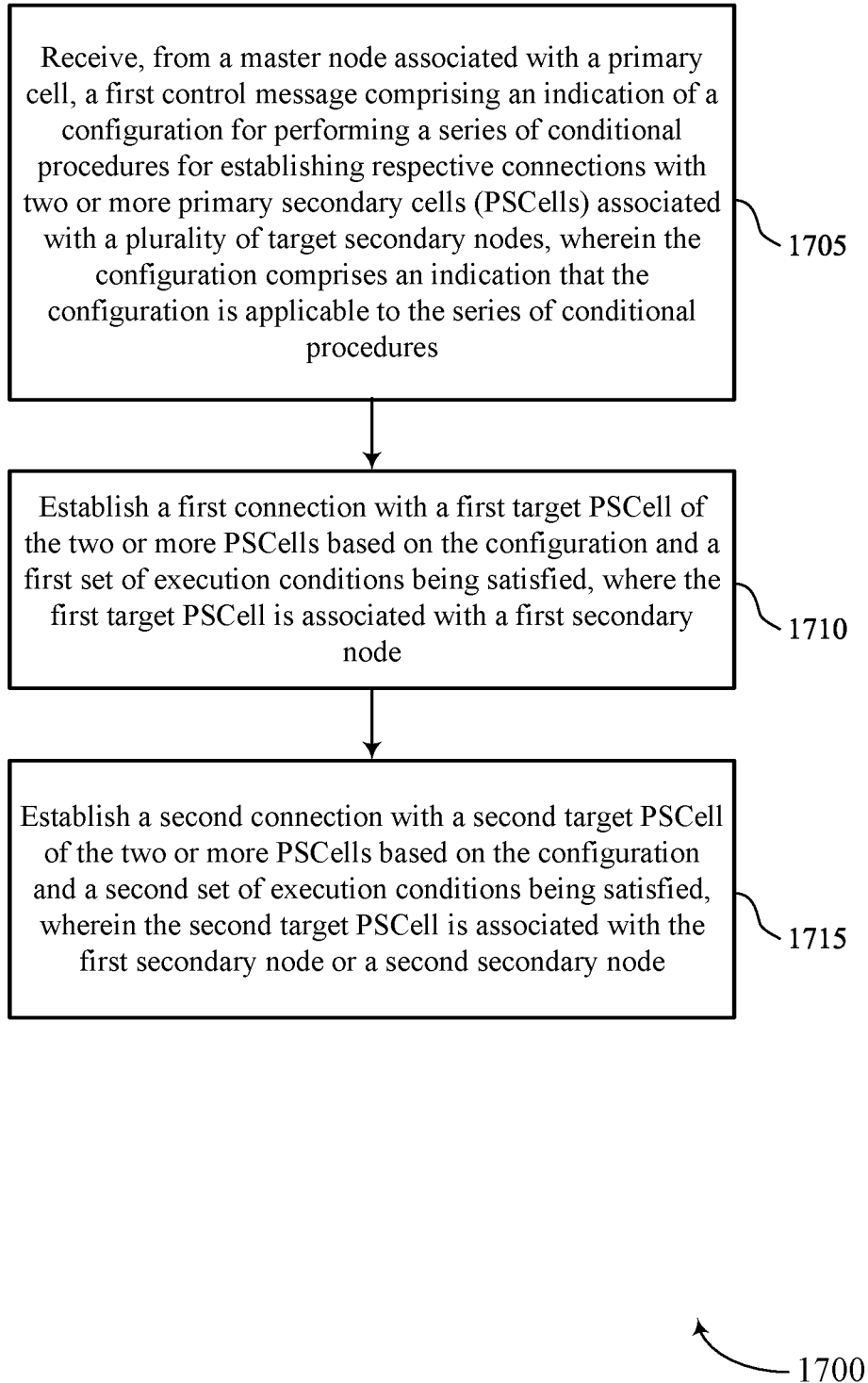
FIGS. 17 through 21 show flowcharts illustrating methods that support techniques for configuring multiple SCGs in accordance with aspects of the present disclosure.

FIG. 17 shows a flowchart illustrating a method 1700 that supports techniques for configuring multiple SCGs in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures. The operations of 1705 may be performed in accordance with examples as disclosed herein. In some examples, aspects of the operations of 1705 may be performed by a control message receiver 1125 as described with reference to FIG. 11.

At 1710, the method may include establishing a first connection with a first target PSCell of the two or more PSCells based on the configuration and a first set of execution conditions being satisfied, where the first target PSCell is associated with a first secondary node. The operations of 1710 may be performed in accordance with examples as disclosed herein. In some examples, aspects of the operations of 1710 may be performed by a connection establishment component 1130 as described with reference to FIG. 11.

At 1715, the method may include establishing a second connection with a second target PSCell of the two or more PSCells based on the configuration and a second set of execution conditions being satisfied, where the second target PSCell is associated with a second secondary node. The operations of 1715 may be performed in accordance with examples as disclosed herein. In some examples, aspects of the operations of 1715 may be performed by a connection establishment component 1130 as described with reference to FIG. 11.

Figure 18:
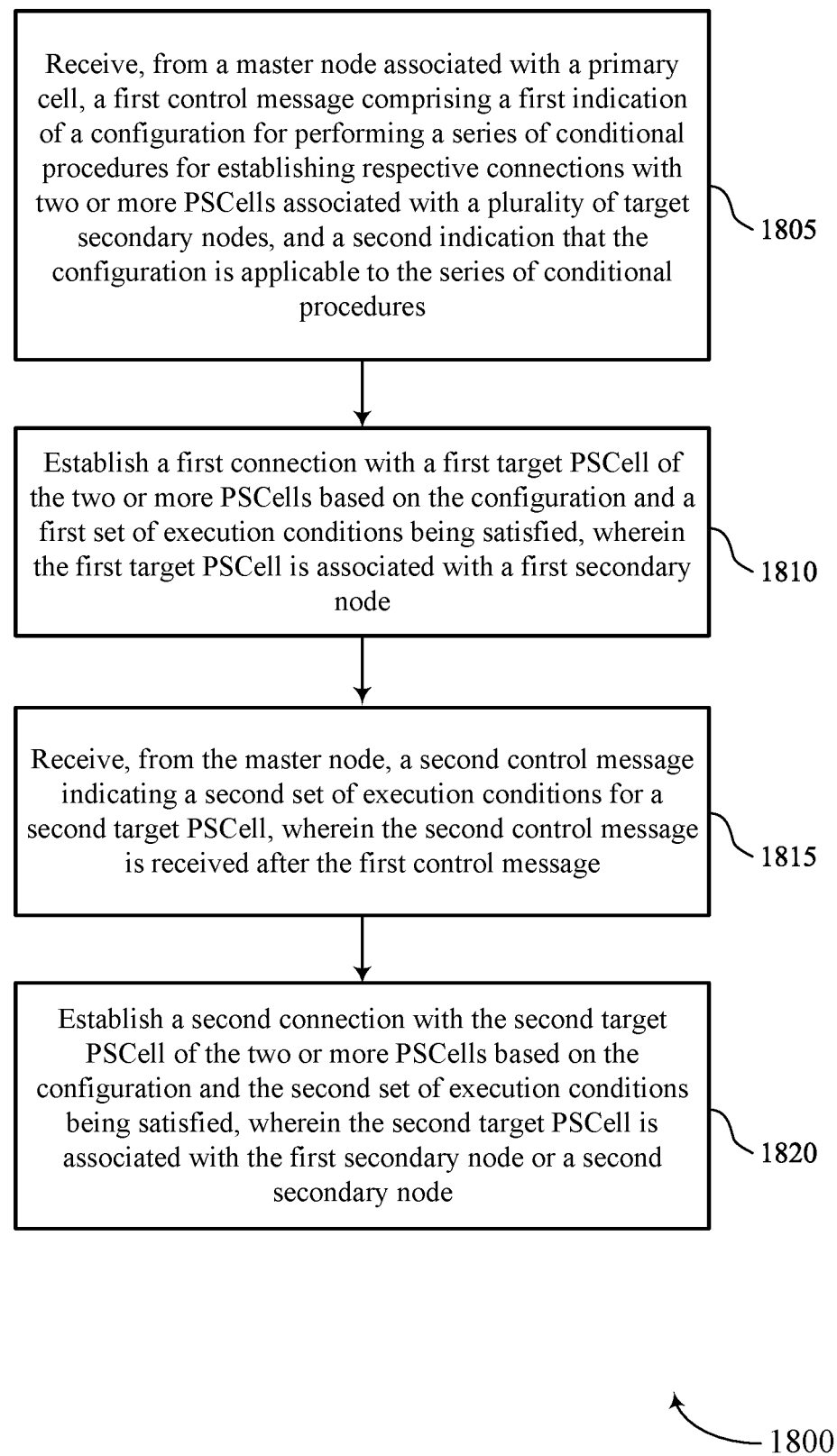

FIG. 18 shows a flowchart illustrating a method 1800 that supports techniques for configuring multiple SCGs in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a master node associated with a primary cell, a first control message including an indication of a configuration for performing a series of conditional procedures for establishing respective connections with two or more PSCells associated with a set of multiple target secondary nodes, where the configuration includes an indication that the configuration is applicable to the series of conditional procedures. The operations of 1805 may be performed in accordance with examples as disclosed herein. In some examples, aspects of the operations of 1805 may be performed by a control message receiver 1125 as described with reference to FIG. 11.

At 1810, the method may include establishing a first connection with a first target PSCell of the two or more PSCells based on the configuration and a first set of execution conditions being satisfied, where the first target PSCell is associated with a first secondary node. The operations of 1810 may be performed in accordance with examples as disclosed herein. In some examples, aspects of the operations of 1810 may be performed by a connection establishment component 1130 as described with reference to FIG. 11.

At 1815, the method may include receiving, from the master node, a second control message indicating a second set of execution conditions for a second target PSCell, where the second control message is received after the first control message. The operations of 1820 may be performed in accordance with examples as disclosed herein. In some examples, aspects of the operations of 1815 may be performed by a control message receiver 1125 as described with reference to FIG. 11.

At 1820, the method may include establishing a second connection with the second target PSCell of the two or more PSCells based on the configuration and the second set of execution conditions being satisfied, where the second target PSCell is associated with a second secondary node. The operations of 1820 may be performed in accordance with examples as disclosed herein. In some examples, aspects of the operations of 1820 may be performed by a connection establishment component 1130 as described with reference to FIG. 11.

Figure 19:
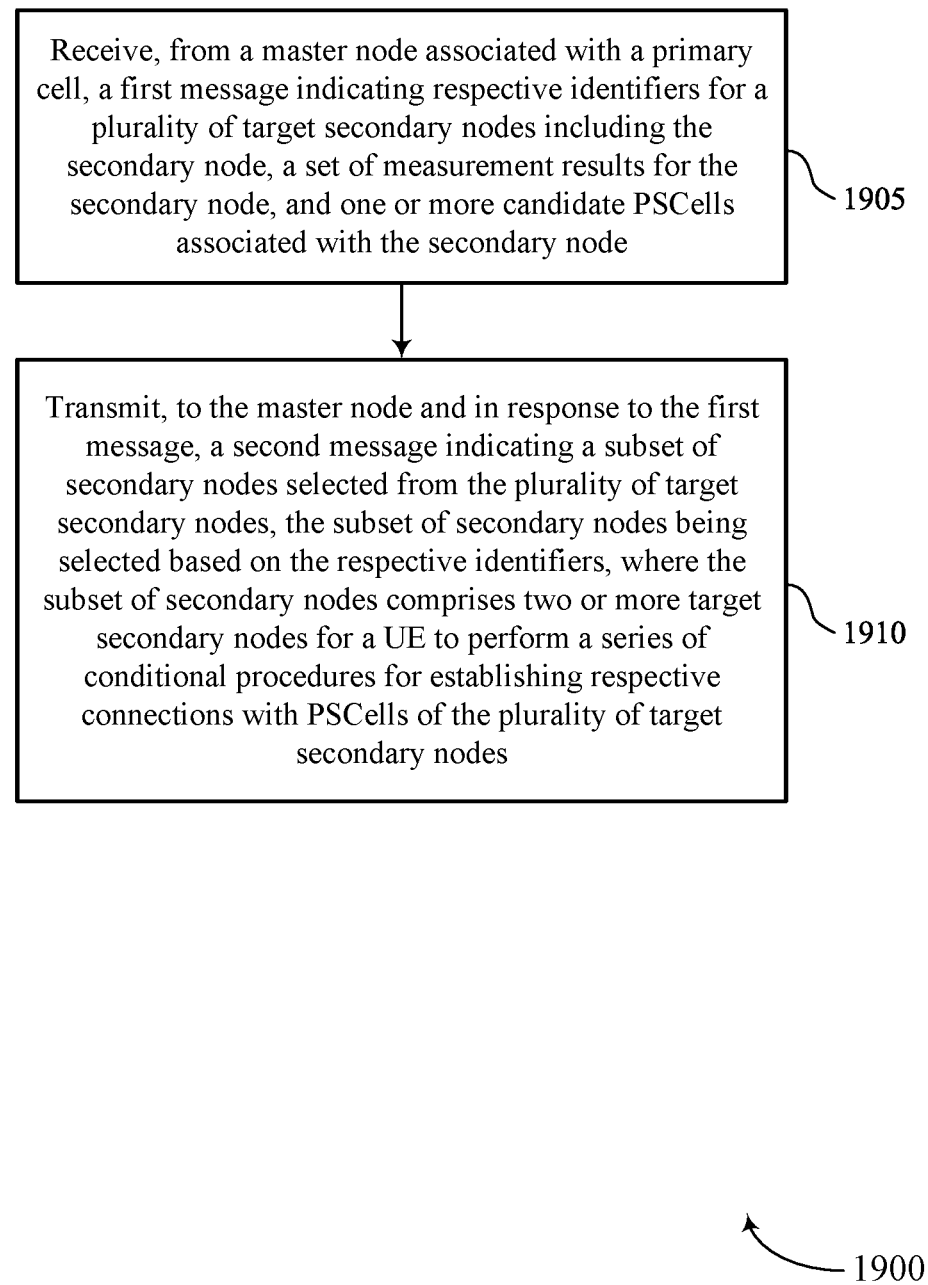

FIG. 19 shows a flowchart illustrating a method 1900 that supports techniques for configuring multiple SCGs in accordance with aspects of the present disclosure. The operations of the method 1900 may be implemented by a network entity (e.g., a secondary node) or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a master node associated with a primary cell, a first message indicating respective identifiers for a set of multiple target secondary nodes including the secondary node, a set of measurement results for the secondary node, and one or more candidate PSCells associated with the secondary node. The operations of 1905 may be performed in accordance with examples as disclosed herein. In some examples, aspects of the operations of 1905 may be performed by a target secondary node manager 1525 as described with reference to FIG. 15.

At 1910, the method may include transmitting, to the master node and in response to the first message, a second message indicating a subset of secondary nodes selected from the set of multiple target secondary nodes, the subset of secondary nodes being selected based on the respective identifiers, where the subset of secondary nodes includes two or more target secondary nodes for a UE to perform a series of conditional procedures for establishing respective connections with PSCells of the set of multiple target secondary nodes. The operations of 1910 may be performed in accordance with examples as disclosed herein. In some examples, aspects of the operations of 1910 may be performed by a secondary node indication manager 1530 as described with reference to FIG. 15.

Figure 20:
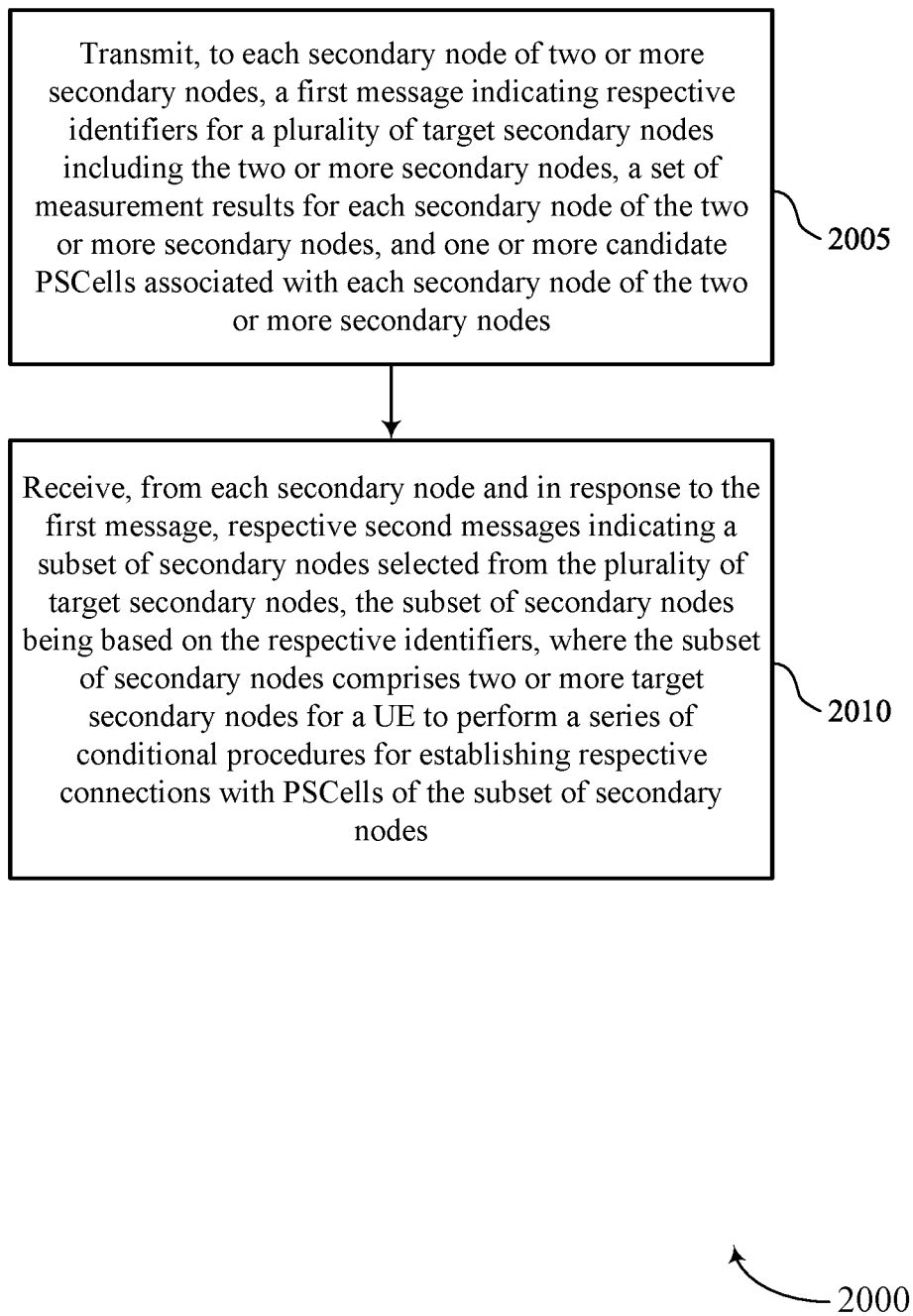

FIG. 20 shows a flowchart illustrating a method 2000 that supports techniques for configuring multiple SCGs in accordance with aspects of the present disclosure. The operations of the method 2000 may be implemented by a network entity or its components as described herein. For example, the operations of the method 2000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to each secondary node of two or more secondary nodes, a first message indicating respective identifiers for a set of multiple target secondary nodes including the two or more secondary nodes, a set of measurement results for each secondary node of the two or more secondary nodes, and one or more candidate PSCells associated with each secondary node of the two or more secondary nodes. The operations of 2005 may be performed in accordance with examples as disclosed herein. In some examples, aspects of the operations of 2005 may be performed by a target secondary node manager 1525 as described with reference to FIG. 15.

At 2010, the method may include receiving, from each secondary node and in response to the first message, respective second messages indicating a subset of secondary nodes selected from the set of multiple target secondary nodes, the subset of secondary nodes being based on the respective identifiers, where the subset of secondary nodes includes two or more target secondary nodes for a UE to perform a series of conditional procedures for establishing respective connections with PSCells of the subset of secondary nodes (e.g., preferred secondary nodes). The operations of 2010 may be performed in accordance with examples as disclosed herein. In some examples, aspects of the operations of 2010 may be performed by a secondary node indication manager 1530 as described with reference to FIG. 15.

Figure 21:
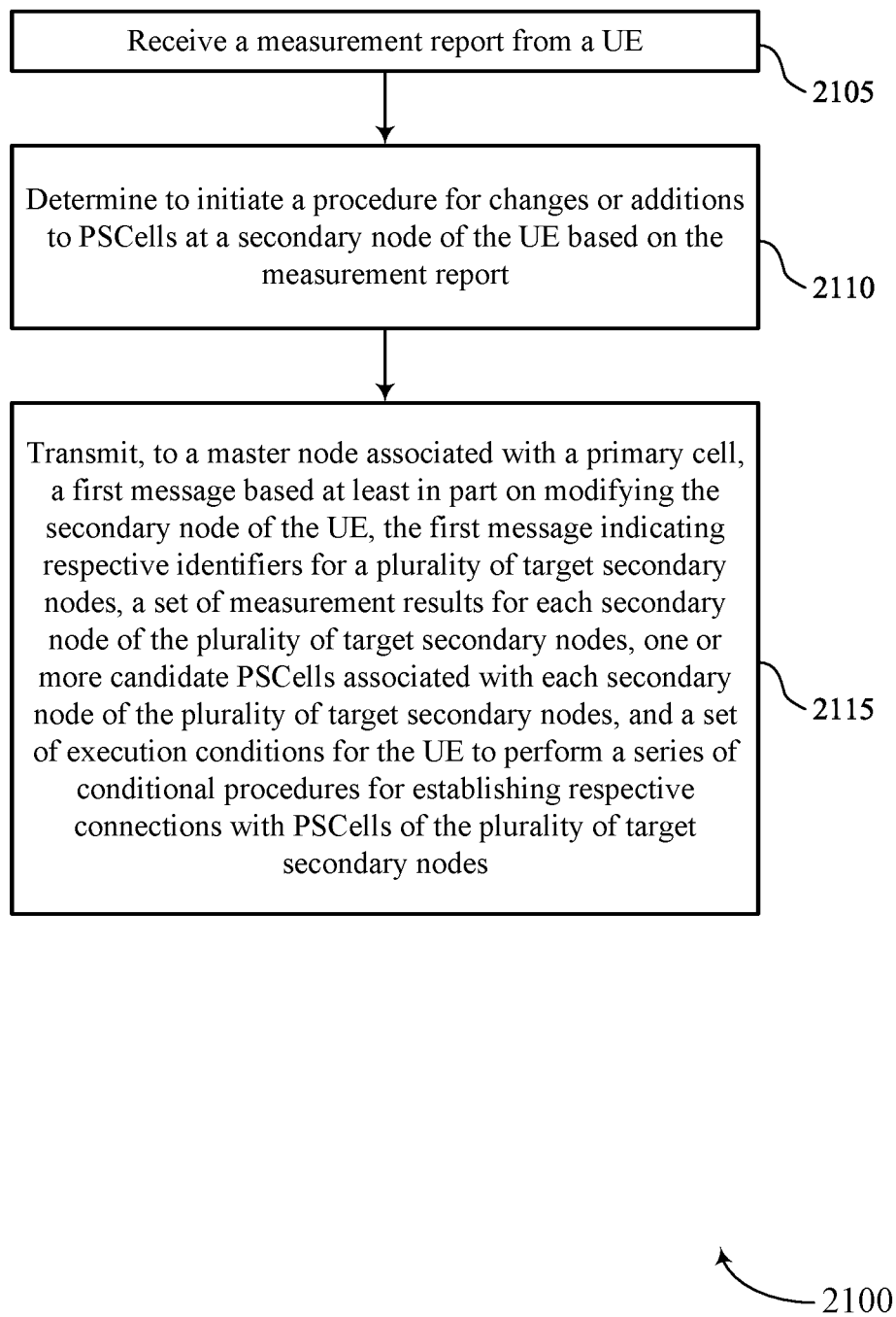

FIG. 21 shows a flowchart illustrating a method 2100 that supports techniques for configuring multiple SCGs in accordance with aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2105, the method may include receiving a measurement report from a UE. The operations of 2105 may be performed in accordance with examples as disclosed herein. In some examples, aspects of the operations of 2105 may be performed by a measurement report manager 1535 as described with reference to FIG. 15.

At 2110, the method may include determining to initiate a procedure for changes or additions to PSCells at a secondary node of the UE based on the measurement report. The operations of 2110 may be performed in accordance with examples as disclosed herein. In some examples, aspects of the operations of 2110 may be performed by a PSCell change and addition manager 1540 as described with reference to FIG. 15.

At 2115, the method may include transmitting, to a master node associated with a primary cell, a first message based on modifying the secondary node of the UE, the first message indicating respective identifiers for a set of multiple target secondary nodes, a set of measurement results for each secondary node of the set of multiple target secondary nodes, one or more candidate PSCells associated with each secondary node of the set of multiple target secondary nodes, and a set of execution conditions for the UE to perform a series of conditional procedures for establishing respective connections with PSCells of the set of multiple target secondary nodes. The operations of 2115 may be performed in accordance with examples as disclosed herein. In some examples, aspects of the operations of 2115 may be performed by a target secondary node manager 1525 as described with reference to FIG. 15.

The following provides an overview of aspects of the present disclosure:

Aspect 1: A method for wireless communications at a UE, comprising: receiving, from a master node associated with a primary cell, a first control message comprising an indication of a configuration for performing a series of conditional procedures for establishing respective connections with two or more primary secondary cells (PSCells) associated with a plurality of target secondary nodes, wherein the configuration comprises an indication that the configuration is applicable to the series of conditional procedures; establishing a first connection with a first target PSCell of the two or more PSCells based at least in part on the configuration and a first set of execution conditions being satisfied, wherein the first target PSCell is associated with a first secondary node; and establishing a second connection with a second target PSCell of the two or more PSCells based at least in part on the configuration and a second set of execution conditions being satisfied, wherein the second target PSCell is associated with the first secondary node or a second secondary node.

Aspect 2: The method of aspect 1, further comprising: receiving, from the master node, a second control message indicating the second set of execution conditions for the second target PSCell, wherein the second control message is received after the first control message.

Aspect 3: The method of aspect 2, wherein the second control message indicates a first measurement configuration for the first target PSCell that is modified with respect to a previous measurement configuration for the first target PSCell, the method further comprising: performing one or more measurements based at least in part on the first measurement configuration for the first target PSCell.

Aspect 4: The method of any of aspects 1 through 3, wherein the configuration comprises an indication of the plurality of target secondary nodes, one or more target PSCells of each secondary node of the plurality of target secondary nodes, a set of execution conditions for an addition of or change to the one or more target PSCells, respective secondary cell group configurations associated with each PSCell of the one or more target PSCells, one or more master cell group configurations, or any combination thereof.

Aspect 5: The method of aspect 4, further comprising: storing the set of execution conditions, the respective secondary cell group configurations associated with each PSCell of the one or more target PSCells, the one or more master cell group configurations, or any combination thereof, based at least in part on the indication that the configuration is applicable to the series of conditional procedures, wherein the series of conditional procedures is based at least in part on storing the set of execution conditions, the respective secondary cell group configurations associated with each PSCell of the one or more target PSCells, the one or more master cell group configurations, or any combination thereof.

Aspect 6: The method of aspect 5, wherein the UE stores the set of execution conditions, the respective secondary cell group configurations, the one or more master cell group configurations, or any combination thereof, after performing an addition of a target PSCell, a change of a target PSCell, or both, based at least in part on the indication.

Aspect 7: The method of any of aspects 1 through 6, wherein the configuration comprises respective PSCell configurations of a plurality of prepared PSCells, each PSCell configuration of the respective PSCell configurations being relative to another PSCell configuration of the respective PSCell configurations, or relative to a source PSCell configuration, or any combination thereof.

Aspect 8: The method of any of aspects 1 through 7, wherein the series of conditional procedures comprises a conditional PSCell change, a conditional PSCell addition, or both.

Aspect 9: A method for wireless communications at a secondary node, comprising: receiving, from a master node associated with a primary cell, a first message indicating respective identifiers for a plurality of target secondary nodes including the secondary node, a set of measurement results for the secondary node, and one or more candidate primary secondary cells (PSCells) associated with the secondary node; and transmitting, to the master node and in response to the first message, a second message indicating a subset of secondary nodes selected from the plurality of target secondary nodes, the subset of secondary nodes being selected based at least in part on the respective identifiers, wherein the subset of secondary nodes comprises two or more target secondary nodes for a UE to perform a series of conditional procedures for establishing respective connections with PSCells of the plurality of target secondary nodes.

Aspect 10: The method of aspect 9, further comprising: transmitting, within the second message, an indication of one or more prepared PSCells associated with the secondary node and a respective secondary cell group configuration for each prepared PSCell of the one or more prepared PSCells; and receiving, from the master node, a third message indicating a set of prepared target PSCells associated with the subset of secondary nodes, the set of prepared target PSCells including the one or more prepared PSCells associated with one of the subset of secondary nodes, wherein the series of conditional procedures is based at least in part on the set of prepared target PSCells.

Aspect 11: The method of aspect 10, further comprising: transmitting, to the master node, a fourth message indicating respective measurement configurations for the one or more prepared PSCells associated with the secondary node in response to the third message, wherein the respective measurement configurations are based at least in part on the set of prepared target PSCells associated with one of the subset of the secondary node.

Aspect 12: The method of aspect 11, further comprising: determining a set of execution conditions associated with each PSCell of the set of prepared target PSCells associated with the subset of secondary nodes; and transmitting, within the fourth message, an indication of the set of execution conditions, wherein the series of conditional procedures are based at least in part on the set of execution conditions.

Aspect 13: The method of aspect 12, wherein the third message comprises one or more measurement results associated with the set of prepared target PSCells, and the set of execution conditions are based at least in part on the one or more measurement results.

Aspect 14: The method of any of aspects 10 through 13, further comprising: receiving, within the third message, an indication of respective PSCell configurations associated with one or more target PSCells of the set of prepared target PSCells, wherein the respective PSCell configurations are indicated as source PSCell configurations; and transmitting, to the master node, a fourth message indicating a secondary cell group configuration for a first target PSCell associated with the secondary node and an indication of whether the secondary cell group configuration is dependent on a source PSCell configuration.

Aspect 15: The method of any of aspects 10 through 14, further comprising: establishing, during a first conditional procedure of the series of conditional procedures, a connection between the UE and a first PSCell associated with the secondary node based at least in part on a first set of execution conditions being satisfied; determining a set of execution conditions associated with each PSCell of the set of prepared target PSCells for subsequent conditional procedures of the series of conditional procedures; and transmitting, to the master node, a fifth message indicating the set of execution conditions and a modified measurement configuration for the first PSCell.

Aspect 16: The method of aspect 15, further comprising: receiving, from the UE, a measurement report comprising measurement results, wherein the set of execution conditions are based at least in part on the measurement results.

Aspect 17: A method for wireless communications at a master node, comprising: transmitting, to each secondary node of two or more secondary nodes, a first message indicating respective identifiers for a plurality of target secondary nodes including the two or more secondary nodes, a set of measurement results for each secondary node of the two or more secondary nodes, and one or more candidate primary secondary cells (PSCells) associated with each secondary node of the two or more secondary nodes; and receiving, from each secondary node and in response to the first message, respective second messages indicating a subset of secondary nodes selected from the plurality of target secondary nodes, the subset of secondary nodes being based at least in part on the respective identifiers, wherein the subset of secondary nodes comprises two or more target secondary nodes for a UE to perform a series of conditional procedures for establishing respective connections with PSCells of the subset of secondary nodes.

Aspect 18: The method of aspect 17, further comprising: receiving, within the respective second messages from the two or more secondary nodes, an indication of one or more prepared PSCells associated with each secondary node and a respective secondary cell group configuration for each prepared PSCell of the one or more prepared PSCells; and transmitting, to each secondary node of the two or more secondary nodes or to each secondary node of the subset of secondary nodes, respective third messages each indicating a set of prepared target PSCells associated with the subset of secondary nodes, wherein the series of conditional procedures is based at least in part on the set of prepared target PSCells.

Aspect 19: The method of aspect 18, further comprising: receiving, from each secondary node of the two or more secondary nodes, respective fourth messages each indicating measurement configurations for one or more PSCells associated with each secondary node in response to a third message of the respective third messages, wherein the measurement configurations are based at least in part on the set of prepared target PSCells.

Aspect 20: The method of aspect 19, further comprising: receiving, within the respective fourth messages, an indication of a set of execution conditions, wherein the series of conditional procedures are based at least in part on the set of execution conditions.

Aspect 21: The method of aspect 20, wherein the respective third messages each comprise one or more measurement results associated with the set of prepared target PSCells, and the set of execution conditions are based at least in part on the one or more measurement results.

Aspect 22: The method of any of aspects 18 through 21, further comprising: transmitting, within the respective third messages, an indication of respective PSCell configurations associated with one or more target PSCells of the set of prepared target PSCells, wherein the respective PSCell configurations are indicated as source PSCell configurations; and receiving, from a first secondary node of the subset of secondary nodes, a fourth message indicating a secondary cell group configuration for a first target PSCell associated with the first secondary node and an indication of whether the secondary cell group configuration is dependent on a source PSCell configuration.

Aspect 23: The method of any of aspects 17 through 22, further comprising: transmitting a first control message indicating a configuration for the series of conditional procedures for establishing respective connections with PSCells associated with the plurality of target secondary nodes and a second indication that the configuration is applicable to the series of conditional procedures.

Aspect 24: The method of aspect 23, wherein the configuration comprises an indication of the subset of secondary nodes, one or more target PSCells of each secondary node of the subset of secondary nodes, a set of execution conditions for an addition of or change to the one or more target PSCells, respective secondary cell group configurations associated with each PSCell of the one or more target PSCells, one or more master cell group configurations, or any combination thereof.

Aspect 25: The method of aspect 24, further comprising: receiving, from at least a first secondary node of the two or more secondary nodes, a fifth message indicating the set of execution conditions and modified measurement configurations for one or more PSCells associated with the first secondary node.

Aspect 26: The method of any of aspects 24 through 25, further comprising: determining the set of execution conditions based at least in part on the subset of secondary nodes.

Aspect 27: The method of any of aspects 23 through 26, wherein the configuration comprises respective PSCell configurations of a plurality of prepared PSCells, each PSCell configuration of the respective PSCell configurations being relative to another PSCell configuration of the respective PSCell configurations, or relative to a source PSCell configuration, or any combination thereof.

Aspect 28: The method of any of aspects 23 through 27, further comprising: transmitting, to the UE, a second control message indicating additional execution conditions for a conditional procedure of the series of conditional procedures, the conditional procedure being subsequent to an initial conditional procedure of the series of conditional procedures, wherein the additional execution conditions are based at least in part on a measurement report from the UE.

Aspect 29: The method of any of aspects 17 through 28, further comprising: receiving a measurement report from the UE; and determining to initiate a procedure for changes or additions of PSCells at a secondary node of the UE based at least in part on the measurement report, wherein the first message is transmitted based at least in part on modifying the secondary node of the UE.

Aspect 30: A method for wireless communications at a first secondary node, comprising: receiving a measurement report from a UE; determining to initiate a procedure for changes or additions to primary secondary cells (PSCells) at a secondary node of the UE based at least in part on the measurement report; and transmitting, to a master node associated with a primary cell, a first message based at least in part on modifying the secondary node of the UE, the first message indicating respective identifiers for a plurality of target secondary nodes, a set of measurement results for each secondary node of the plurality of target secondary nodes, one or more candidate PSCells associated with each secondary node of the plurality of target secondary nodes, and a set of execution conditions for the UE to perform a series of conditional procedures for establishing respective connections with PSCells of the plurality of target secondary nodes.

Aspect 31: The method of aspect 30, further comprising: receiving, from the master node, a second message indicating one or more prepared PSCells associated a subset of secondary nodes selected from the plurality of target secondary nodes; determining a modified measurement configuration associated with the first secondary node; and transmitting, to the master node, a third message indicating the modified measurement configuration.

Aspect 32: An apparatus for wireless communications at a UE, comprising a processor; memory coupled with the processor; and instructions stored in the memory and executable by the processor to cause the apparatus to perform a method of any of aspects 1 through 7.

Aspect 33: An apparatus for wireless communications at a UE, comprising at least one means for performing a method of any of aspects 1 through 7.

Aspect 34: A non-transitory computer-readable medium storing code for wireless communications at a UE, the code comprising instructions executable by a processor to perform a method of any of aspects 1 through 7.

Aspect 35: An apparatus for wireless communications at a secondary node, comprising a processor; memory coupled with the processor; and instructions stored in the memory and executable by the processor to cause the apparatus to perform a method of any of aspects 9 through 16.

Aspect 36: An apparatus for wireless communications at a secondary node, comprising at least one means for performing a method of any of aspects 9 through 16.

Aspect 37: A non-transitory computer-readable medium storing code for wireless communications at a secondary node, the code comprising instructions executable by a processor to perform a method of any of aspects 9 through 16.

Aspect 38: An apparatus for wireless communications at a master node, comprising a processor; memory coupled with the processor; and instructions stored in the memory and executable by the processor to cause the apparatus to perform a method of any of aspects 17 through 29.

Aspect 39: An apparatus for wireless communications at a master node, comprising at least one means for performing a method of any of aspects 17 through 29.

Aspect 40: A non-transitory computer-readable medium storing code for wireless communications at a master node, the code comprising instructions executable by a processor to perform a method of any of aspects 17 through 29.

Aspect 41: An apparatus for wireless communications at a first secondary node, comprising a processor; memory coupled with the processor; and instructions stored in the memory and executable by the processor to cause the apparatus to perform a method of any of aspects 30 through 31.

Aspect 42: An apparatus for wireless communications at a first secondary node, comprising at least one means for performing a method of any of aspects 30 through 31.

Aspect 43: A non-transitory computer-readable medium storing code for wireless communications at a first secondary node, the code comprising instructions executable by a processor to perform a method of any of aspects 30 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a master node associated with a primary cell, a first control message comprising an indication of a configuration for performing a series of conditional procedures for establishing respective connections with two or more primary secondary cells (PSCells) associated with a plurality of target secondary nodes, wherein the configuration comprises an indication that the configuration is applicable to the series of conditional procedures;
   establishing a first connection with a first target PSCell of the two or more PSCells based at least in part on the configuration and a first set of execution conditions being satisfied, wherein the first target PSCell is associated with a first secondary node;
   retaining the configuration after establishing the first connection with the first target PSCell, wherein retaining the configuration comprises the UE storing a set of execution conditions for an addition of or change to one or more target PSCells, respective secondary cell group configurations associated with each PSCell of the one or more target PSCells, one or more master cell group configurations, or any combination thereof, after performing an addition of a target PSCell, a change of a target PSCell, or both, based at least in part on the indication; and
   establishing a second connection with a second target PSCell of the two or more PSCells based at least in part on the retained configuration and a second set of execution conditions being satisfied, wherein the second target PSCell is associated with the first secondary node or a second secondary node.

2. The method of claim 1, further comprising:
   receiving, from the master node, a second control message indicating the second set of execution conditions for the second target PSCell, wherein the second control message is received after the first control message.

3. The method of claim 2, wherein the second control message indicates a first measurement configuration for the first target PSCell that is modified with respect to a previous measurement configuration for the first target PSCell, the method further comprising:
   performing one or more measurements based at least in part on the first measurement configuration for the first target PSCell.

4. The method of claim 1, wherein the configuration comprises an indication of the plurality of target secondary nodes, one or more target PSCells of each secondary node of the plurality of target secondary nodes, the set of execution conditions for an addition of or change to the one or more target PSCells, the respective secondary cell group configurations associated with each PSCell of the one or more target PSCells, the one or more master cell group configurations, or any combination thereof.

5. The method of claim 4, further comprising:
   storing the set of execution conditions, the respective secondary cell group configurations associated with each PSCell of the one or more target PSCells, the one or more master cell group configurations, or any combination thereof, based at least in part on the indication that the configuration is applicable to the series of conditional procedures, wherein the series of conditional procedures is based at least in part on storing the set of execution conditions, the respective secondary cell group configurations associated with each PSCell of the one or more target PSCells, the one or more master cell group configurations, or any combination thereof.

6. The method of claim 1, wherein the configuration comprises respective PSCell configurations of a plurality of prepared PSCells, each PSCell configuration of the respective PSCell configurations being relative to another PSCell configuration of the respective PSCell configurations, or relative to a source PSCell configuration, or any combination thereof.

7. A method for wireless communications at a secondary node, comprising:
receiving, from a master node associated with a primary cell, a first message indicating respective identifiers for a plurality of target secondary nodes including the secondary node, a set of measurement results for the secondary node, and one or more candidate primary secondary cells (PSCells) associated with the secondary node; and
transmitting, to the master node and in response to the first message, a second message indicating a subset of secondary nodes selected from the plurality of target secondary nodes, the subset of secondary nodes being selected based at least in part on the respective identifiers, wherein the subset of secondary nodes comprises two or more target secondary nodes for a user equipment (UE) to perform a series of conditional procedures for establishing respective connections with PSCells of the plurality of target secondary nodes.

8. The method of claim 7, further comprising:
transmitting, within the second message, an indication of one or more prepared PSCells associated with the secondary node and a respective secondary cell group configuration for each prepared PSCell of the one or more prepared PSCells; and
receiving, from the master node, a third message indicating a set of prepared target PSCells associated with the subset of secondary nodes, the set of prepared target PSCells including the one or more prepared PSCells associated with one of the subset of secondary nodes, wherein the series of conditional procedures is based at least in part on the set of prepared target PSCells.

9. The method of claim 8, further comprising:
transmitting, to the master node, a fourth message indicating respective measurement configurations for the one or more prepared PSCells associated with the secondary node in response to the third message, wherein the respective measurement configurations are based at least in part on the set of prepared target PSCells associated with one of the subset of the secondary node.

10. The method of claim 9, further comprising:
determining a set of execution conditions associated with each PSCell of the set of prepared target PSCells associated with the subset of secondary nodes; and
transmitting, within the fourth message, an indication of the set of execution conditions, wherein the series of conditional procedures are based at least in part on the set of execution conditions.

11. The method of claim 10, wherein the third message comprises one or more measurement results associated with the set of prepared target PSCells, and wherein the set of execution conditions are based at least in part on the one or more measurement results.

12. The method of claim 8, further comprising:
receiving, within the third message, an indication of respective PSCell configurations associated with one or more target PSCells of the set of prepared target PSCells, wherein the respective PSCell configurations are indicated as source PSCell configurations; and
transmitting, to the master node, a fourth message indicating a secondary cell group configuration for a first target PSCell associated with the secondary node and an indication of whether the secondary cell group configuration is dependent on a source PSCell configuration.

13. The method of claim 8, further comprising:
establishing, during a first conditional procedure of the series of conditional procedures, a connection between the UE and a first PSCell associated with the secondary node based at least in part on a first set of execution conditions being satisfied;
determining a set of execution conditions associated with each PSCell of the set of prepared target PSCells for subsequent conditional procedures of the series of conditional procedures; and
transmitting, to the master node, a fifth message indicating the set of execution conditions and a modified measurement configuration for the first PSCell.

14. The method of claim 13, further comprising:
receiving, from the UE, a measurement report comprising measurement results, wherein the set of execution conditions are based at least in part on the measurement results.

15. A method for wireless communications at a master node, comprising:
transmitting, to each secondary node of two or more secondary nodes, a first message indicating respective identifiers for a plurality of target secondary nodes including the two or more secondary nodes, a set of measurement results for each secondary node of the two or more secondary nodes, and one or more candidate primary secondary cells (PSCells) associated with each secondary node of the two or more secondary nodes; and
receiving, from each secondary node and in response to the first message, respective second messages indicating a subset of secondary nodes selected from the plurality of target secondary nodes, the subset of secondary nodes being based at least in part on the respective identifiers, wherein the subset of secondary nodes comprises two or more target secondary nodes for a user equipment (UE) to perform a series of conditional procedures for establishing respective connections with PSCells of the subset of secondary nodes.

16. The method of claim 15, further comprising:
receiving, within the respective second messages from the two or more secondary nodes, an indication of one or more prepared PSCells associated with each secondary node and a respective secondary cell group configuration for each prepared PSCell of the one or more prepared PSCells; and
transmitting, to each secondary node of the two or more secondary nodes or to each secondary node of the subset of secondary nodes, respective third messages each indicating a set of prepared target PSCells associated with the subset of secondary nodes, wherein the series of conditional procedures is based at least in part on the set of prepared target PSCells.

17. The method of claim 16, further comprising:
receiving, from each secondary node of the two or more secondary nodes, respective fourth messages each indicating measurement configurations for one or more PSCells associated with each secondary node in response to a third message of the respective third messages, wherein the measurement configurations are based at least in part on the set of prepared target PSCells.

18. The method of claim 17, further comprising:
receiving, within the respective fourth messages, an indication of a set of execution conditions, wherein the series of conditional procedures are based at least in part on the set of execution conditions.

19. The method of claim 18, wherein the respective third messages each comprise one or more measurement results associated with the set of prepared target PSCells, and wherein the set of execution conditions are based at least in part on the one or more measurement results.

20. The method of claim 16, further comprising:
transmitting, within the respective third messages, an indication of respective PSCell configurations associated with one or more target PSCells of the set of prepared target PSCells, wherein the respective PSCell configurations are indicated as source PSCell configurations; and
receiving, from a first secondary node of the subset of secondary nodes, a fourth message indicating a secondary cell group configuration for a first target PSCell associated with the first secondary node and an indication of whether the secondary cell group configuration is dependent on a source PSCell configuration.

21. The method of claim 15, further comprising:
transmitting a first control message indicating a configuration for the series of conditional procedures for establishing respective connections with PSCells associated with the plurality of target secondary nodes and a second indication that the configuration is applicable to the series of conditional procedures.

22. The method of claim 21, wherein the configuration comprises an indication of the subset of secondary nodes, one or more target PSCells of each secondary node of the subset of secondary nodes, a set of execution conditions for an addition of or change to the one or more target PSCells, respective secondary cell group configurations associated with each PSCell of the one or more target PSCells, one or more master cell group configurations, or any combination thereof.

23. The method of claim 22, further comprising:
receiving, from at least a first secondary node of the two or more secondary nodes, a fifth message indicating the set of execution conditions and modified measurement configurations for one or more PSCells associated with the first secondary node.

24. The method of claim 22, further comprising:
determining the set of execution conditions based at least in part on the subset of secondary nodes.

25. The method of claim 21, wherein the configuration comprises respective PSCell configurations of a plurality of prepared PSCells, each PSCell configuration of the respective PSCell configurations being relative to another PSCell configuration of the respective PSCell configurations, or relative to a source PSCell configuration, or any combination thereof.

26. The method of claim 21, further comprising:
transmitting, to the UE, a second control message indicating additional execution conditions for a conditional procedure of the series of conditional procedures, the conditional procedure being subsequent to an initial conditional procedure of the series of conditional procedures, wherein the additional execution conditions are based at least in part on a measurement report from the UE.

27. The method of claim 15, further comprising:
receiving a measurement report from the UE; and
determining to initiate a procedure for changes or additions of PSCells at a secondary node of the UE based at least in part on the measurement report, wherein the first message is transmitted based at least in part on modifying the secondary node of the UE.

* * * * *